United States Patent [19]

Frank

[11] Patent Number: 5,121,699
[45] Date of Patent: Jun. 16, 1992

[54] RECLAMATION METHOD AND APPARATUS FOR SOIL AND OTHER PRODUCTS

[76] Inventor: Lowell C. Frank, 5124 Road P, Okauchee, Wis. 53122

[21] Appl. No.: 654,164

[22] Filed: Feb. 12, 1991

[51] Int. Cl.⁵ .................. A47J 36/00; A47J 36/24
[52] U.S. Cl. ........................... 110/246; 110/226; 110/236; 110/240; 110/346; 423/DIG. 20
[58] Field of Search ............. 110/236, 246, 226, 346, 110/240, 241; 432/118; 423/DIG. 20

[56] References Cited

U.S. PATENT DOCUMENTS

| | | | |
|---|---|---|---|
| 3,882,801 | 5/1975 | Bolle | 110/246 X |
| 4,300,837 | 11/1981 | Malbrundt | 432/118 X |
| 4,597,737 | 7/1986 | Raghavan et al. | 432/118 X |
| 4,974,528 | 12/1990 | Barcell | 110/236 X |
| 5,020,452 | 6/1991 | Rybak | 110/236 X |
| 5,027,721 | 7/1991 | Anderson | 110/236 |

FOREIGN PATENT DOCUMENTS 3216771  12/1982  Fed. Rep. of Germany ...... 110/236

*Primary Examiner*—Edward G. Favors
*Attorney, Agent, or Firm*—Andrus, Sceales, Starke & Sawall

[57] ABSTRACT

A method and apparatus for remedial treatment of soil with volatile contaminants includes a rotating drum having a firebox projecting a flame into the discharge end of the drum. An inlet conveyor enters soil which tumbles through the drum atmosphere which is recycled through the firebox and drum for contaminant incineration in the drum. The recycled atmosphere moves in a circular path about the outer edge of the furner flame to form an annular flame projecting into the drum. A part of the drum recycled atmosphere processed through a final burn box to destroy remaining contaminants, and a cooler for cooling the atmosphere. A separator connected to the cooler separates solids and moisture to discharge a contaminant free atmosphere. The temperature of the discharged soil and the recycled atmosphere from the drum as well as the final processed atmosphere is monitored for controlling the system operation. The several mechanical and electrical components are monitored to provide selected system control. A portable unit includes a mobile base frame with the drum with the attached firebox and burn box mounted side-by-side. A U-shaped cooler pipe and a horizontal centrifugal separator overlying the drum and box. A recycle pipe and blower is located within the cooler piping to form an over-the-road mobile unit. Special components and interconnections are shown and described.

77 Claims, 11 Drawing Sheets

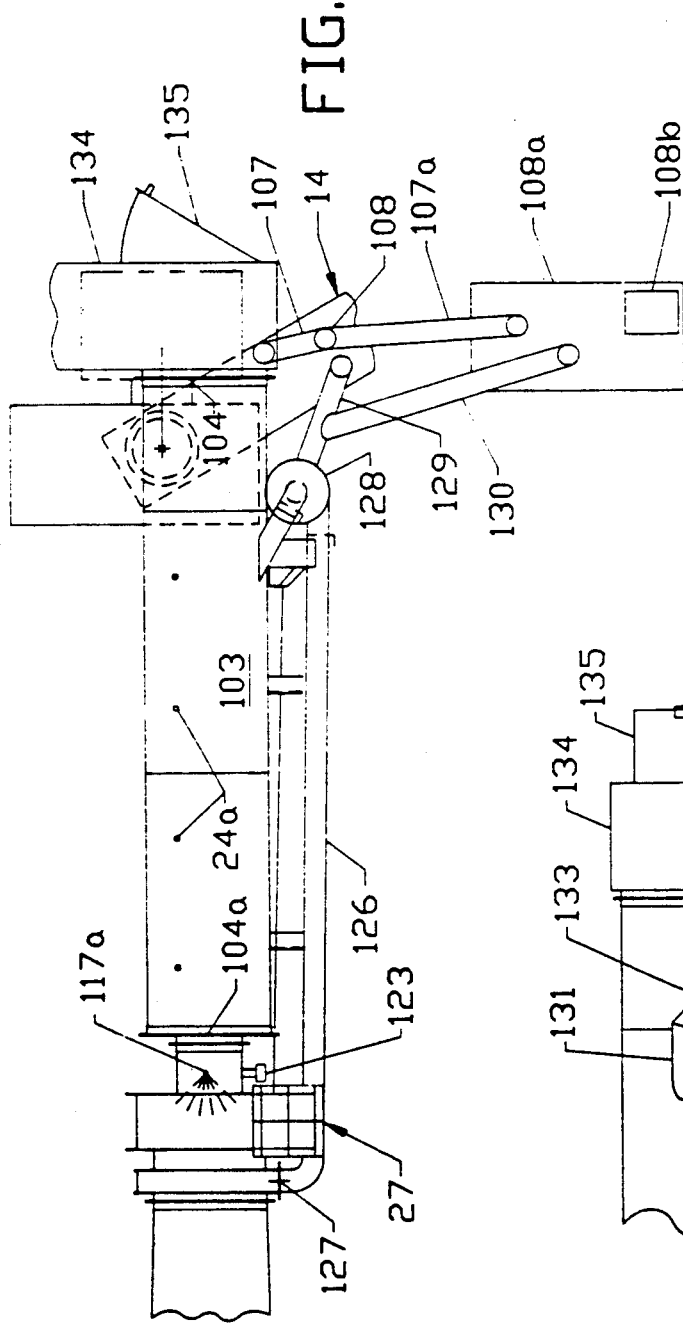

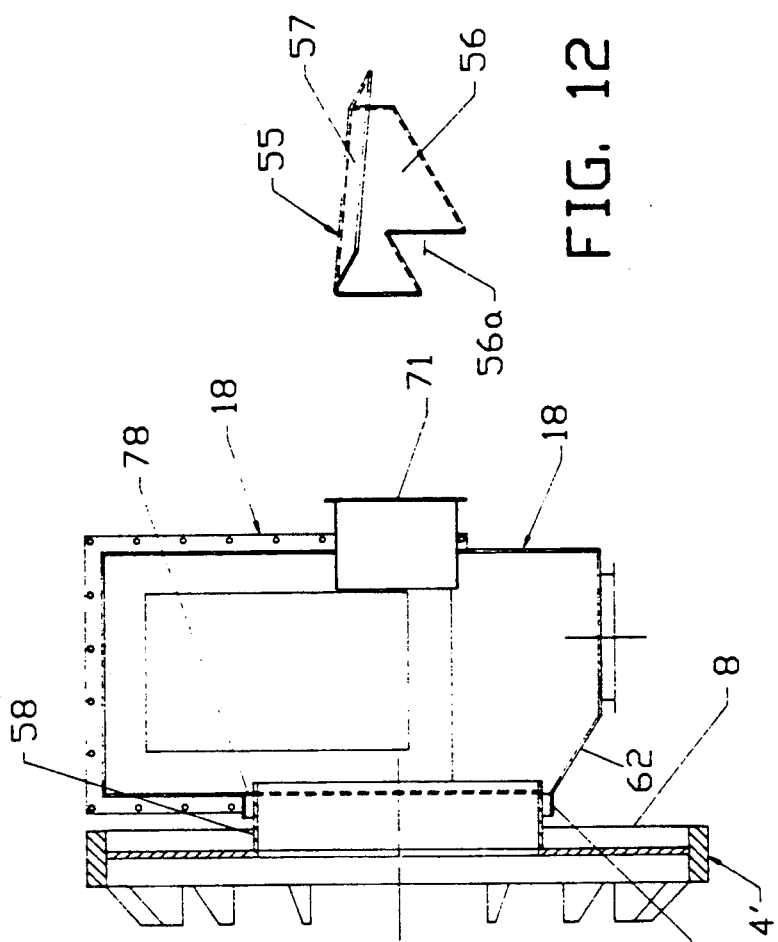
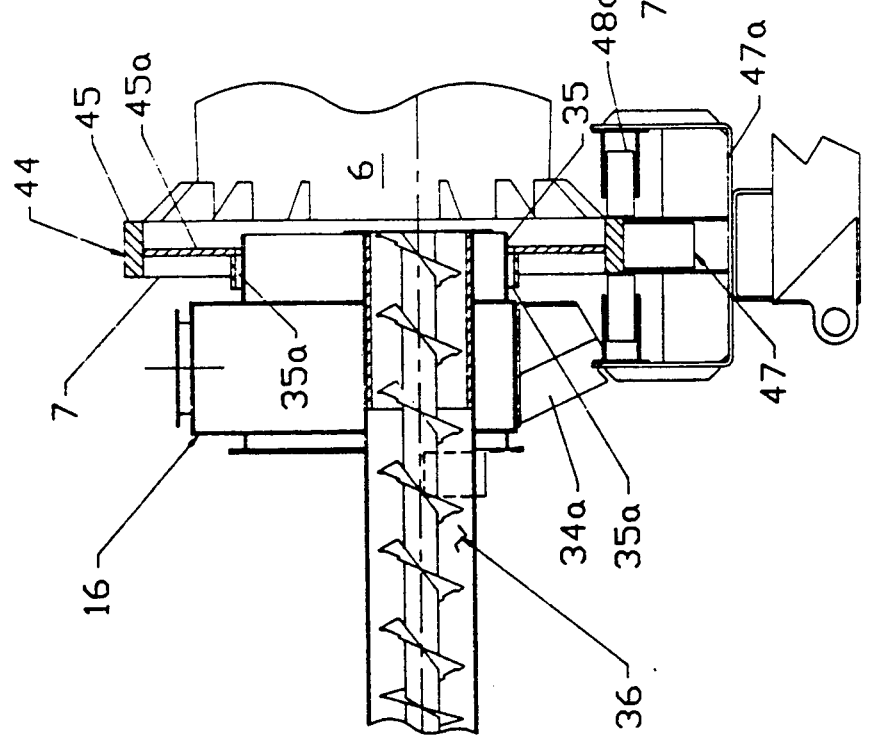

RECLAMATION METHOD AND APPARATUS FOR SOIL AND OTHER PRODUCTS

BACKGROUND OF THE PRESENT INVENTION

This invention relates to an apparatus and method for reclamation of soil and other products including heat responsive contaminant substances and particularly to such an apparatus for processing of soil contaminated with general petroleum-based contaminant substances and the like.

Recent developments in relationship to waste disposal of products associated with various petroleum-based activities have resulted in extensive discovery and location of serious levels of contamination. Various reclamation requirements have been issued by governmental agencies with respect to removing of contaminates from the soil. In many instances, complete removal of the contaminated soil has been required, with replacement of an appropriate non-contaminated soil. The necessity of eliminating soil contaminants has resulted in treating the removed soil to reclaim the soil free of contamination by various processes. A recent suggestion includes subjecting of the soil to heat to in essence remove contaminants by converting them to a gaseous state, removing the gases with the contaminant substances and destroying them by separate processing. The process has been particularly applied to petroleum-based contaminated sites.

Various large treatment facilities have been constructed. There is however a very great demand and need for a more efficient system of soil reclamation and particularly for an apparatus which provides convenient portability such that the apparatus can be readily moved between sites such that the apparatus is adapted not only for relatively substantial reclamation projects but more significantly for relatively small reclamation projects.

Typical of relatively small installations requiring soil reclamation are retail gasoline stations the like. The typical station has used buried storage tanks for storing of different gasolines and other petroleum-based products. With the recent development of both lead and unleaded gasoline as well as increased variation in the octane ratings, use of additives such as ethanol, the number of storage tanks required has increased. The problem has also been increased by the increasing size of the gasoline and automobile service stations over the years. In many installations, some ground leakage has been almost inevitable, with a resulting contamination of the soil. In many instances, prior to the more recent realization of soil contamination, oil and similar petroleum products have been routinely disposed of directly on the grounds of the gasoline station. In other instances, such products have been transported and disposed at a common ground waste site, which may or may not cover significant areas with resulting contaminants. Treatment of such sites have almost uniformly required the removal of the tanks and removal of the contaminated soil for replacement with fresh soil, or treatment and replacement with the reclaimed soil.

Generally, reclamation apparatus has been developed for large, fixed reclamation installation. In fixed systems, the soil is removed and transported to the reclamation apparatus.

Recent suggestions have provided relatively large apparatus in which the various individual components may have a degree of portability. The components can be moved and installed at an area for a more convenient transport of soil from various locations to the reclamation apparatus. Although the apparatus has a certain degree of portability, because of the complexity and size thereof, the apparatus may not be practically transported from one relatively small contaminated site to another. In addition, the complexity and size of the apparatus results in a significant equipment cost factor as well as high relocation cost. More recently, U. S. Pat. No. 4,951,417, which issued Nov. 2, 1982, discloses a system which has been commercially offered in which at least one unit is shown mounted on a large oversized trailer unit, which is subject to special governmental approval and can be transported over-the-road. However, the apparatus as advertised provides an optional afterburner equipment which requires a large separate transport trailer to complete the system, as well as the specially licensed, oversized, over-the-road trailer.

Further, the apparatus for relatively fixed installation is relatively expensive to operate and requires significant supply of fuel to operate the burners and the like. Such apparatus has found use however because of the severity of the problem and the governmental requirements relating to the treatment of contaminated soil.

There is a demand for improved apparatus for processing products including contaminant substances and particularly to a portable unit which can be transported over-the-road without a special license and the like. The apparatus must operate efficiently and effectively to remove the contaminant substances at an acceptable cost.

SUMMARY OF THE PRESENT INVENTION

The present invention is particularly directed to a product reclamation method and apparatus using an incineration drum structure, with a burner for creating a high temperature incinerating atmosphere within the drum in combination with a gaseous recycling system for recycling of the burnable constituents resulting from the treating of the soil or other product to provide an effective reclaiming of the product by destroying of the contaminants within the incineration drum. The reclaimed or discharge product is essentially devoid of burnable contaminant substances such as a petroleum-based contaminants. The method and apparatus of this invention can be used whenever the contaminated product includes substances which can be separated and destroyed by heating of the contaminated product.

Generally, in accordance with a preferred construction of the present invention, a rotatable drum is mounted, preferably with internal vane means, for propelling of soil and like products as a tumbling, broken, flowing material from an entrance end to a discharge end of the drum. A high temperature burner is located within the drum, and preferably in the discharge end of the drum, to heat the atmosphere and product within the drum and create a combustible atmosphere for petroleum-based or like heat responsive contaminant elements in the product being reclaimed. A single pass of the contaminated product, such as soil contaminated with general petroleum-based products, through the incinerating drum is generally sufficient for essentially removal of at least substantial contaminant substances. The gas mixture after appropriate recycling is passed through an appropriate solid separating device to separate the solid from the discharge gasses. The gaseous mixture is always recycled through the incinerating drum. The treated product may be discharged to a suitable receiver.

The gaseous mixture including fine particles of the treated product are fed back to the drum burner unit and constitute recovered fuel for further firing the burner within the rotary drum.

In a practical construction, the drum is preferably formed as a tapered drum having a relatively small inlet end and a large outlet end. The drum includes special feed screws at the inlet end carrying the soil into relatively straight vanes. The soil then moves and cascades through the drum with the volatile matter being heated and released within the high temperature environment with the discharged soil free of the volatile contaminants and discharged at an elevated temperature to insure the release of all volatile contaminants. The drum includes special discharged paddles at the discharge end of the drum to carry the material upwardly to the top of the drum and drop the soil downwardly through the outlet end and through the flame generated by the burner and the firing of the recycled gaseous mixture or atmosphere. The forward end of the drum is provided with a special inlet box through the which the gases are discharged into the recycle passageway. The forward end of the drum is also supported for rotation and against axial movement. The discharge end of the drum is supported for rotation but is free to move axially to compensate for changes in the drum sized with temperature variations. A recycle pipe assembly connects the inlet box and the firebox with a blower unit for pressurizing the system. The firebox is mounted to the discharge end in a special manner to create a small air gap providing an auxiliary air path into the firebox which combines with the recycled atmosphere to form a high temperature flame projecting into the drum for incineration of volatile matter. The inlet end is also preferably constructed with an auxiliary air inlet passageway. As more fully developed in connection with the illustrated embodiments, the input conveyor unit and the burner mounting for the firebox unit are specially constructed to provide optimum flowthrough of the material and optimum generation of the flame which is projected from the firebox into the drum.

The drum is preferably mounted as a self-contained assembly with a final burn unit, a cooling unit and a separator to separate the solid particle from the cleansed exhaust gas product into a self-contained over-the-road unit. The drum is mounted to one side of a frame structure. A large final burn housing is secured to the opposite side of the frame and extends in parallel adjacent relation to the drum. The final burn unit includes an upper coupling to a cooling pipe unit formed in a generally U-shaped configuration overlying the final burn unit and the drum. A particle separator is secured to and forms an extension of the cooling pipe unit. The recycle pipe assembly is located within the U-shaped cooling unit and separator, such the size of the self-contained is suitable for over-the-road travel without special travel permits and the like.

Various other unique features and control systems are disclosed in the illustrated embodiment of the invention.

The present invention thus provides a particularly practical apparatus and method for remediation of soil and other products which can be readily adapted to various requirements, and particularly relatively small applications which preferably include frequent movement of the processing apparatus to various remediation sites.

BRIEF DESCRIPTION OF THE DRAWINGS

The drawings furnished herewith illustrate a best mode presently contemplated for carrying out the invention and such mode is described hereinafter.

In the drawings:

FIG. 12 is a separate view of a soil discharge paddle structure shown in FIGS. 4 and 5;

FIG. 13 is an enlarged view of the end coupling between the tapered drum and the firebox unit as shown in the previous FIGS.;

FIG. 14 is an enlarged side view with parts broken away and sectioned and illustrating the coupling between the soil input feed conveyor and the inlet end structure of the tapered drum including the support for the drum; and FIGS. 15 and 16 illustrate an alternate embodiment of part of the first embodiment of the invention.

DESCRIPTION OF THE ILLUSTRATED EMBODIMENT

Figure 1:
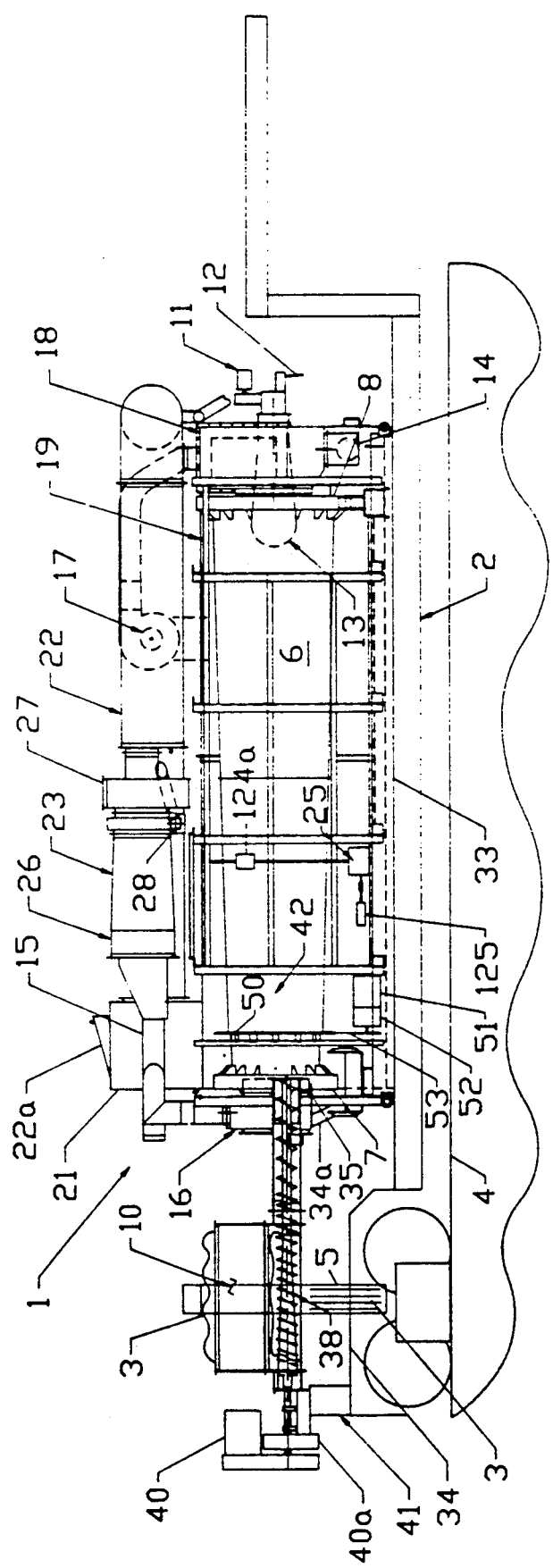
FIG. 1 is a side elevational view of a portable embodiment of the invention.
Figure 2:
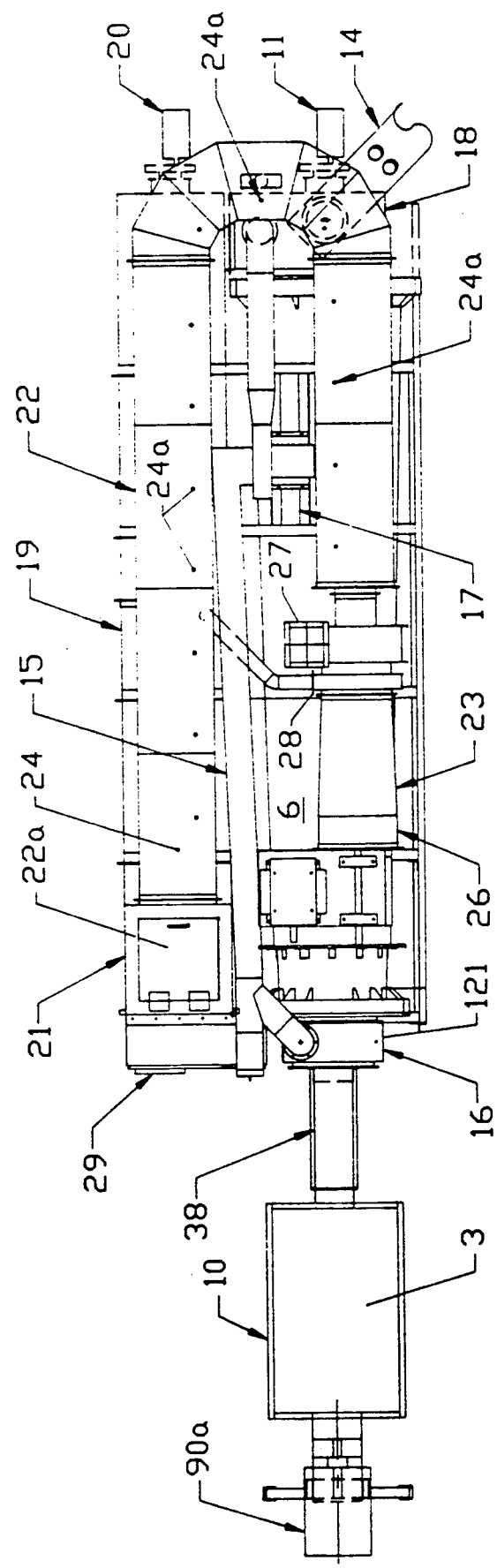
FIG. 2 is a top elevational view of Fig. 1.

Referring to the drawings and particularly to FIGS. 1 and 2, a self-contained soil reclamation apparatus 1 is mounted on an over-the-road trailer 2 for convenient over-the-road transport to various ground sites for soil reclamation. The trailer 2 is of the variety adapted to be interconnected to an over-the-road tractor or any suitable towing vehicle to pull the trailer with the self-contained soil reclamation apparatus 1 within the road limits set by various states. The trailer 2 may be placed at the site of contaminant soil for direct loading of apparatus 1 with contaminated product. Thus, soil 3 to be treated may be removed from the ground 4 and transferred by a suitable conveyor assembly 5 or any suitable loading device for transfer of the soil to the soil reclamation apparatus 1. Alternatively, the soil may be withdrawn from ground within a reasonable distance of the apparatus and trucked to the apparatus for processing. The present invention with its inherent portability is readily adapted to movement from one reclamation area to another, generally avoiding or minimizing the necessity for over-the-road trucking.

Generally, in accordance with the illustrated embodiment of the invention, an incineration drum 6 is rotatably mounted on the support structure of the apparatus 1. The drum 6 has a soil receiving input end 7 and a soil discharge output end 8 at the opposite ends of the drum.

Soil 3 delivered into the drum 6 moves through the drum. A plurality of internal flights 9 (FIG. 4) secured within the drum surface interior and serve to lift the soil about the periphery of the drum 6, with the soil 3 cascading downwardly through the drum in a continuous manner as it moves through the drum. An infeed conveyor unit 10 receives the soil 3 and is operated to provide an essentially continuous stream of soil 3 into and through the drum 6. In the illustrated embodiment, a single pass of the soil 3 through the drum 6 provides for complete removal of contaminants and the discharge of the soil essentially free of all contaminants in accordance with governmental requirements as a result of the heat treating of the soil within the incineration drum 6. A burner unit 11 is mounted to the discharge end 8 of the drum 6 and is connected to a suitable source of fuel such as natural gas, LP gas, oil or the like, as at 12. The burner unit 11 generates a high temperature flame 13 which is projected inwardly from the burner unit 11 into the drum 6 to heat the soil and create a high temperature incineration environment within the drum, with the soil preferably passing through the flame 13 and being discharged from the discharge end 8 of the drum into a discharge conveyor unit 14. As more fully developed hereinafter, the atmosphere within the drum 6 is raised to a relatively high temperature sufficient to ignite and incinerate contaminant substances driven from the soil 3.

The present invention, particularly as applied to petroleum-based contaminated soil, is operated at the elevated soil temperature to insure complete volatilization and essential destruction of a significant portion if not substantially all of the volatile subject matter. Generally in commercial practice for the treating of soil contaminated with oil and other similar petroleum-based products, the apparatus is specially designed and the control set to operate within a preferred defined range of soil temperatures. The environment and the flame 13 are controlled to heat the soil 3 in this particular application such that it discharges at the discharge end 8 at a temperature generally in excess of 400° F. (Fahrenheit) and may be as high as 800° F. If the volatile matter in the soil or other contaminated product is generally of a character which ignites at a significantly lower temperature, the present invention can, of course, be operated at a lower internal temperature with destruction by incineration of more volatile contaminated product. For example, if soil contaminated with a gasoline is processed through the drum structure, the incineration system could well operate at a lower soil temperature. The volatile gasoline would readily be released at very low temperatures, and the atmosphere within the chamber unit or drum would rapidly rise to and be maintained at a lower minimum temperature, providing substantial incineration by recycling through the rotating drum structure as presently described. Depending upon the characteristic of the contaminant substance, the atmosphere passed through the final processing system may include only traces of the contaminant and require little further incineration. Thus, as the soil tumbles through the drum, the contaminant substances are driven from the soil generally as a vapor and gas mixture within the drum environment. The gaseous mixture or atmosphere within drum 6 generally will include minute solid particulate, generally known as and referred to herein as fines. An atmosphere recycle line 15 is connected between an inlet box 16 at the inlet end 7 of the drum 6 and a firebox 18 at the outlet end 8 and thus the burner unit 11 for continuous recycling of a significant portion of the atmosphere gas mixture. A recycle blower unit 17 is connected in the recycle line 15 and serves to create a negative pressure at the inlet end 7 and inlet box 16 of the drum relative to the discharge outlet end 8 and firebox 18. As a result, the atmosphere including the contaminated gas mixture and substances is continuously drawn through the drum 6 and the burner flame 13 which projects well into the drum. The recycled atmosphere is in the illustrated embodiment, returned to the firebox 18 and specially injected into the firebox in relation with the burner unit 11 to constitute a significant fuel source for creation and propagation of the flame 13. Generally, the burner unit 11 includes the burner box 18 within which a burner nozzle 18a of the burner unit 11 is terminated. The recycled atmosphere is introduced adjacent flame 13 from nozzle 18a (FIG. 7) and is ignited and contributes to flame 13. In the presence of recycled gases, the burner unit 11 maintains continuous combustion of the recycled gas mixture atmosphere and may function solely as a pilot burner.

The flame 13 is shown created essentially coaxially of the drum and thus is directed downwardly through the center of the drum within the rotating and cascading soil. The soil 3 tumbles downwardly through the drum and through the very high temperature atmosphere created within the drum, which temperature is substantially above that of the discharged soil 3. With certain highly contaminant products or soil products, the temperature has been raised above 1300° F. and function to establish and maintain complete incineration of the contaminant products driven from the soil such that recycled gas mixtures can be discharged from the apparatus essentially free of contaminants. In such systems it is generally required to maintain operation of the burner at a significant level.

Generally the apparatus is preferably operated with the incineration drum 6 acting and functioning to establish complete driving of the volatile matter and contaminants from the soil in a single pass, with destruction of at least substantial levels of the contaminants products within the rotating incineration drum 6 as a result of the multi-passing of the drum atmosphere through the high temperature environment created within the drum 6. A limited and relatively low level of contaminants will generally exist in the atmosphere in the recycle line 15 at the burner box 18 and require subsequent final processing to meet governmental standards in certain areas.

In the illustrated embodiment of the invention, the burner box 18 includes a lateral collection and discharge chamber 18b through which a portion of the recycled atmosphere and fines are withdrawn and pass directly into a high temperature scavenging or final burn unit 19, shown in FIG. 2. As more fully developed hereinafter, the scavenging burn unit 19 is a large expansion chamber extending toward the forward or inlet end of the drum 6. Unit 19 is under a negative pressure differential causing the product to move through the unit. A suitable separate fired burner unit 20 is mounted in the end wall of the unit 19 and generates a flame to raise the temperature within the box to a level of 1600° to 1700° F. or more. The burner 20 may be located in part of the unit 19 and is shown in the end wall for convenient mounting with the main drum burner unit 11. The high temperature within unit 19 provides for further burning of the gas mixture or atmosphere including heating of the fines to drive any containment from the fines in the recycled atmosphere to further cleanse the fines of all containments. Unit 19 thus provides for final processing of the fines and driven off gases to remove the small remaining contaminants, if any, and insure that both the gas mixture and soil fines are both essentially 100% free of any containment. When the fines and gases are discharged from properly operating apparatus 1, conformance with the most restrictive governmental regulations as to the soil and gases can be assured.

From the burn unit 19, the exhaust gaseous mixture and fines are subjected to an appropriate processing to separate the fines from the gaseous mixture for appropriate discharge of both.

A transfer box 21 is formed at the discharge end of unit 19 and projects upwardly for connection to a quench unit 22. The transfer box 21 includes an explosion cover 22a as a protective response.

A generally U-shaped quench unit 22 is secured to the box 21. The gas mixture and fines are transferred into the inlet end of the quench unit 22 and treated therein to reduce the temperature to a level for treatment in a particulate separator unit 23. The quench unit 22 is an elongated U-shaped tubular passage-way including water nozzles 24 for moisturizing of the gaseous mixture flowing from the burner unit 19. A motor-driven water pump unit 25 (FIG. 1) is mounted to the support structure and connected to nozzle 24. In the illustrated embodiment, additional nozzles 24a are shown in the quench tube unit. The additional nozzles 24a provide for a thorough washing of the system and may be used where necessary for additional cooling of the gases and the particulate for appropriate processing in the separator unit 23 without destruction thereof.

The separator unit 23 is shown is manufactured and sold by Progressive Development, Inc. of Milwaukee, Wisconsin under the tradename Powerclone, and generally is shown in U. S. Pat. No. 4,357,152, which issued on Nov. 2, 1982. The separator unit 23 includes a motor-driven suction blower assembly 26 for pressurizing of the separator unit 23 and creating a negative pressure within the total system including the final burn box 19 and the U-shape quench unit 22. The separator unit 23 includes a fluid exhaust outlet 27 through which the clean, non-contaminated gas mixture is exhausted to outdoor atmosphere or the like, essentially 100% contaminant free. Fines or particulate matter carried to the final processing unit are discharged through a special skimmer outlet 28 for direct discharge and transfer to a collector, or preferably recycled through the quench unit 22 for discharge, as hereinafter described.

The apparatus includes various condition monitors controls hereinafter described. A control box 29 is noted to the structure at the discharge end of the final burn unit 19. The control box preferably contains a computer based monitor and control system adapted to collect information with respect to the status of the various operating components such as the motors and blowers as well as the water supply and the temperature at the various critical locations in the system to insure proper total operation of the apparatus. If any critical part of the system is not operating properly, so as to insure the removal of containment products, the total system is preferably shut down and an appropriate signal is given to the operator. The control establishes a totally self-contained apparatus which can be readily trailer mounted and transported from one site to another.

More particularly, in the preferred construction shown in FIG. 1, the total assembly other than the discharge conveyor unit 114 and the in-feed conveyor unit 10, are shown fixedly mounted on a single base frame 33 for fixed or releasable mounting to the trailer 2. The frame 33 is heavy rectangular structure formed from longitudinal and cross beams welded to form a rigid structure. The length of the frame extends somewhat longer than the length of the drum and firebox. The drum and other components are mounted to the frame 33 with suitable support structures. When fixedly mounted to the trailer 2, the trailer structure can be provided with a raised platform 34 at the trailing end. The in-feed conveyor unit 10 is located over the platform 34. The in-feed conveyor unit 10 can be suitably supported on the platform 34 as an effectively fixed mounting of the apparatus to the trailer for on site movement. In this construction, only the discharge conveyor unit 14 is removed and releasably carried for example on the platform or other part of the trailer if available or in another suitable manner. Alternatively, the in-feed conveyor unit 10 is adapted to be released and inserted into the inlet 7 of drum 6 during transport.

In the illustrated embodiment of the invention, inlet feed box unit 16 is a rectangular box secured to the forward end of the drum 6 and supported by an under support structure 34a, as shown in FIGS. 1 and 14. The box includes a coupling tube 35 projecting inwardly into an opening in the drum 6. The tube 35 has a slightly smaller outer diameter than the drum opening to form a slight space 35a therebetween. The exterior wall of the box 16 has a flanged opening to receive the conveyor unit 10.

Figure 6:
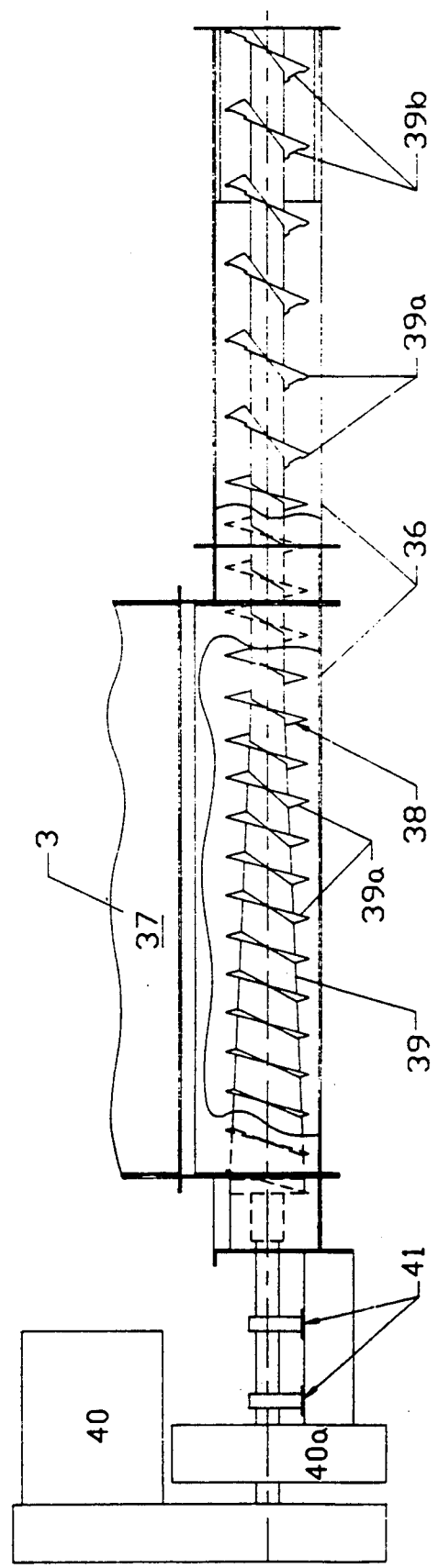
FIG. 6 is an enlarged view of an input conveyor unit with parts broken away and sectioned.

As shown in FIGS. 1, 2 and 6, the in-feed conveyor unit 10 includes a conveyor tube 36 with an end flange which extends through an inlet tube 35. The outer end of the conveyor tube 36 has an open top construction to receive the feed hopper 37 with dirt dropping downwardly through the hopper 37 into the tube 36. A special feed screw 38 is mounted within the tube 36 extended throughout the length of the tube including the hopper 37 and the discharge end of the tube which projects inwardly of the drum through the inlet box coupling tube 35. The feed screw 38 as more clearly shown in FIG. 6 is specially constructed with a flight structure aligned with hopper 37 in which a larger diameter center shaft tube 39 includes constant diameter flights 39a formed at the outer most end of the tube 36 and the hopper 37. The tube core 39 progressively decreases in diameter to a relatively small diameter adjacent the inner end of the hopper 37 and the closed portion of tube 36. This provides a soil removal from the hopper 37 in a level manner. The flights structure is formed as a continuous diameter flight within the closed tube portion 36 with the periphery in close fitting relationship within the bore of the feed tube 36. The outer flight are specially constructed with notched edges 39b to contribute to the intermixing of the soil 3, breaking up of soil clumps and the like while continuously moving the soil in a continuous manner through the tube 36 and discharging thereof directly into the drum 6 immediately outwardly of the coupling tube 35.

The feed screw 38 has its shaft projecting outwardly of the outer open end of the tube. The screw shaft is coupled to a suitable electric motor 40 through a gear reduction unit 40a to provide for the transfer of soil of various consistencies which are encountered in soil reclamation projects and with a continuous inflow of the soil 3 at a rate directly related to the speed of the feed screw 38. The motor 40 is preferably a variable speed motor permitting variation in the soil feed rate in accordance with other parameters such as the soil temperature, the gas mixture temperatures and the like, as more fully discussed hereinafter. More particularly, the conveyor motor 40 for the infeed conveyor unit 10 may be of any desirable construction operable to provide continuous feed of the contaminated soil into the rotating drum. The motor is preferably a variable speed, variable frequency motor to allow varying of the feed rate. The motor provides a high torque output over the speed range and the speed of the motor 40 is varied by varying of the frequency of the power supply in accordance with well known systems. Applicant has found that the variable frequency drive provides a highly reliable and long life control and one which provides the necessary high torque required for feeding of the soil in a continuous manner through the infeed conveyor unit and into the rotating drum structure.

The inlet conveyor unit 10 as described is supported by a support structure 41 secured at the motor assembly and the hopper 37 and resting on the trailer. platform to support the unit 10 for operation and over-the-road travel.

The soil is introduced into the narrow inlet end of the drum 6 and falls under gravity into the drum, which is specially constructed to feed the product through the drum with a continuous tumbling motions.

Figure 4:
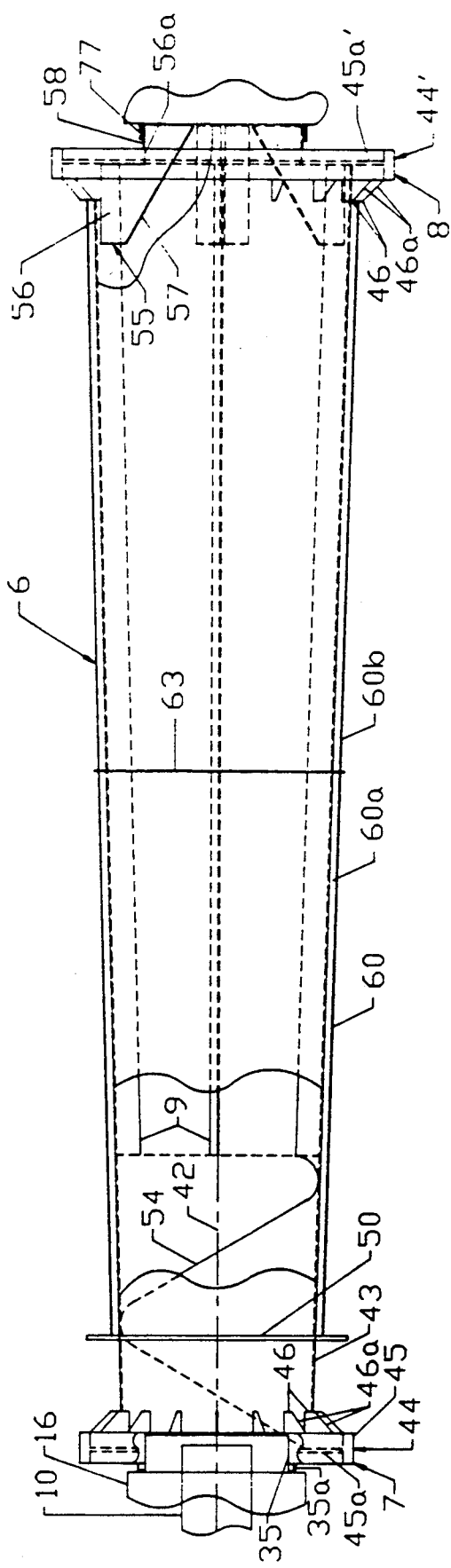
FIG. 4 is an enlarged side elevational view of a tapered drum shown in FIGS. 1 and 2.

As more clearly shown in FIG. 4, the rotary drum 6 is a substantially tapered metal shell 43 having a narrow inlet end 7 and increases progressively to the discharge end 8 which is significantly larger. With the drum 6 located on a horizontal axis 42 of rotation, the soil moves downwardly from the inlet to the discharge end through the rotating tapered drum.

As shown in FIGS. 1, 3, 9 and 14, the drum is rotatably supported at the opposite ends on special iron wheels 44 welded to shell 43 and 44' respectively. Each wheel 44 is of a diameter related to the diameter of the drum and is generally similarly constructed. Referring to the inlet end wheel 44 and FIG. 14, it is shown as a solid round rim 45 and an inner mounting flange 45a secured within the axial edge or end of the rim 45 aligned with the end wall of the drum. The flange 45a is shown as an integral extension of the end wall plate of the drum shell and projects from the exterior diameter of the drum shell 43 to properly locate the wheel rim 45. A plurality of circumferentially distributed gusset plates 46 are welded within the wheel and the adjacent face of the tapered metal shell 43. Each gusset plate 46 thus has an inner portion conforming to the L-shaped configuration of the wheel and projects outwardly beyond the wheel rim 45 with a slightly tapered outer edge 46a. The gusset structure strengthens the wheel support and also functions as an air moving or fan element to promote cooling air movement over the wheel.

The drum wheel 44 is supported or laterally spaced trunions 47 (shown in FIGS. 3 and 5 for the real wheel 44') which are secured by suitable brackets 47a to the main frame 33. The front trunions 47 includes vertical support wheels 48 and horizontal guide wheels 48a for maintaining the drum in proper rotating relation on the main frame 33.

The rear wheel support structure including wheel 44' is in part essentially the same as the front wheel structure just described and the corresponding elements are identified by corresponding primed numbers. In the illustrated embodiment of the invention, axial guide wheels 48a are only located as a part of the wheel support port for the forward drum wheel 44.

The wheel 44' at the discharge end of the drum is merely supported by the trunion wheels 48' without axial guide wheels. The guide wheels 48a adjacent the inlet or forward drum wheel 44 support the drum 6 against axial movement. The temperature of the drum 6 varies significantly between shut down and operating condition, creating significant drum expansion and contraction. The discharge end of the drum 6 is the hottest portion of the drum and will have the greatest amount of expansion and contraction, and thus movement. The axially unrestricted support of the wheel 44' at the discharge end of the drum 6 permits the drum shell 43 to grow and retract slightly with changes in temperature without adversely effecting the system operation or creating damaging forces on the system components.

Figure 5:
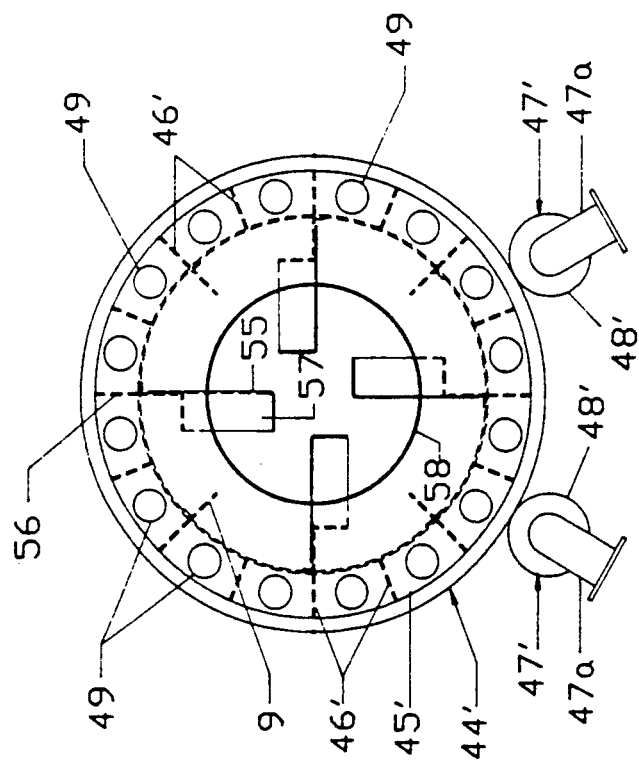
FIG. 5 is an enlarged vertical end view of the tapered drum.

The wheel 44' and support structure adjacent the discharge end is located adjacent to the burner box 18 and the hottest soil 3. The rear wheel assembly is therefore in the highest temperature region of the drum. To further promote the cooling, the wheel flange 45a'- which is an extension of the end plate wall of metal shell 43 is provided, as shown in FIG. 5, with circumferentially spaced openings 49 between each of the gusset plates 46. The fan action of gusset plates 46' and openings 49 further promote the movement of cooling air about the rear wheel structure to thereby minimize heating and promote a long life and reliable operation.

Depending upon the temperature condition encountered and maintained in the design and operation of the drum structure, additional cooling can be conveniently provided by supplying water cooling, such as by feeding water to the upper end of the rear wheel assembly and particularly the gusset structure. The gusset and wheel structure would combine to form chambers for the water, and the rotation of the wheel would result in a water fall type effect to further cool the wheel and its supporting structure. For soil reclamation as more fully discussed in connection with this embodiment, applicant has found that air cooling is adequate.

In the illustrated embodiment, the drum 6 is rotated at a constant speed by a motor-chain drive assembly. Referring to FIG. 1, a sprocket 50 is welded to the drum 6 in a predetermined space relation to the drum inlet end 7. A drive motor 51 is mounted to the frame 33 and includes a gear reducer 52 having an output drive sprocket coupled by a chain 53 to the drum sprocket 50 to positively drive the drum at a selected speed. The drum typically rotate at a speed of approximately thirteen revolutions per minute.

Referring to FIG. 4, the internal soil treating structure of the drum consist of an archimedes in-feed screw 54 adjacent the inlet end of the drum and a plurality of simple, straight linear vanes 9 extending from the screw 54 to the discharge end of the drum 6. Although a single archimedes screw flight is diagrammatically illustrated at 54 in FIG. 4, in actual practice a plurality of flights are used, including four separate flights secured within the inlet portion of the drum 6 and extended from the inlet end to the straight, flat vanes 9. The screw flights are spaced to terminate in alignment with a different straight vane of the drum. Eight vanes 9 were provided within the drum unit, with the four screws flights arranged to terminate in engagement with every other vane. Although not critical, applicant has found that the combination provides a highly satisfactory and reliable system operation.

A plurality of special discharge directing paddles 55 are secured within the drum adjacent the vanes 9 at the discharge opening of the drum 6. Paddles 55 are specially shaped to pickup the soil and discharge the soil through flame 13 and into the lower end of the burner firebox 18, from which it is discharged to the conveyor unit 14.

The screw 54 is a spiral vane such as four acrhimedes flights extending partially into the drum and throughout a length of approximately one fifth of the total drum length. The soil 3 drops downwardly into the in-feed screw and is positively propelled forwardly of the drum by the rotating screw action. The soil 3 enters the area of vanes 9 and continues to move downwardly as a result of the incline orientation of the drum wall and particularly tapered metal shell 43. The vanes 9 pickup the material at the bottom area of the drum and carry it upwardly. The soil cascades down from the upper portion throughout the rotating drum. Depending upon the characteristic of the soil 3, the soil tends to move downwardly over the complete cross-sectional area of the drum to the bottom where the vanes 9 again pickup the soil and recycle the soil movement. The soil tends to move downwardly through the tapered drum. The vanes 9 project partially into the drum and generally form a central opening or passageway through which the drum atmosphere environment passes to consistently heat the soil 3 and drive off the volatile substances or gases from the soil. The volatile gases are entrained within the atmosphere, with counter flow through the drum as a result of the recycle blower 17. The soil thus moves through the drum to the discharge paddles 55 which are especially constructed to propel the material from the drum into the lower portion of the burner firebox 18.

Referring particularly to FIGS. 4, 5 and 12, a discharge paddle 55 is more fully illustrated. Each paddle includes planar members in a generally L-shape cross sectional configuration. A first leg 56 of the L-shape configuration is a plate member having a cutout portion 56a and defines an outer portion welded or otherwise rigidly affixed to a paddle 55 and with leg 56 projecting inwardly radially from the vane 9 and outwardly through the outlet end 8 of the drum. The second leg 57 is extended at 90° to the leg 56 and the attached vane 9. Leg 57 projects generally circumferentially of the drum. The leg 57 is angled to form a generally inclined plane which is an inclined diametric plane through the drum. Leg 57 projects outwardly, from the drum 6 a tubular coupling tube 58 which projects into firebox 18 from the end wall plate of drum 6. As the drum rotates, the paddle 55 moves from a horizontal plane carrying the dirt upwardly on the leg 56 to the vertical plane, and dropping the soil downwardly onto the adjacent leg 57. The adjacent leg 57 is inclined downwardly and extends into the burner firebox 18 and into the burner flame 13 and the recycle flame in the burner structure to discharge the treated hot soil into and through the flame 13 and the lower end of the firebox 18, and particularly a discharge outlet unit 58a shown as a short flanged tube at the lower end of the firebox 18 in FIGS. 3, 7 and 8.

The interior of the drum shell 43 may be lined with a high temperature insulation of any suitable high temperature and abrasive resistant insulation which can withstand the mechanical encounter with the soil 3. The outside of the drum shell 43 is covered with a insulating weather cover 60 to the opposite sides of the chain sprocket and retains the heat for optimum processing of the soil 3. Cover 60 includes an insulation layer 60a abutting the drum wall and an outer metal shell 60b. The shell is sufficiently rigid and strong to permit walking on the covered drum 6.

The drum 6 may be twenty feet in length. To facilitate construction of the drum 6, an interconnecting ring 63 which insures the concentricity of the drum as well as contributing to ease of manufacturing is welded to the drum. The drive sprocket 50 is preferably located from the center ring 63 of the drum a distance equal to the distance from the ring 63 and to the large end support wheel 44'. This permits forming the same length blanket or weather cover 60 for the drum 6 to the opposite sides of the ring.

The lower end of the firebox 18 is formed with a plurality of inclined walls 61 and particularly inclined sidewalls and a short inclined wall 62 extending from a vertical lower wall adjacent the drum opening tube 58. The soil 3 thus is dropped through the flame 13 and tube 58 onto the short inclined wall 62 as well as the adjacent sidewalls and moves downwardly under gravity under the propelling force from the paddles 55. The lower end of the box 18 terminates in a bottom opening and outlet unit 58a through which the hot soil falls into conveyor unit 14 by gravity.

The soil 3 is discharged from the drum 6 at the elevated temperature, up to 800° F. and drops through the flame 13 and the bottom end of the firebox 18 to conveyor unit 14.

Figure 3:
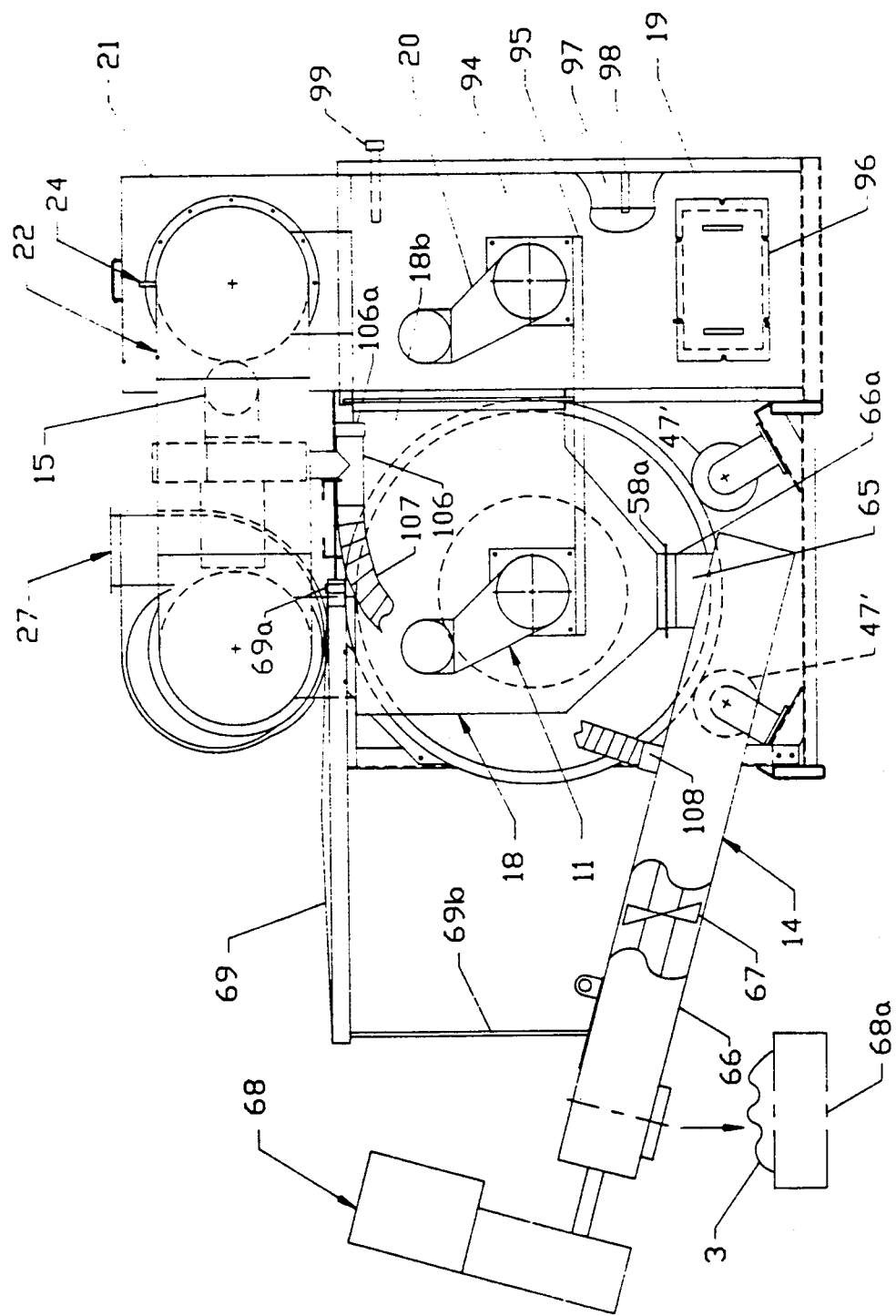
FIG. 3 is an end elevational view of the structure.
Figure 8:
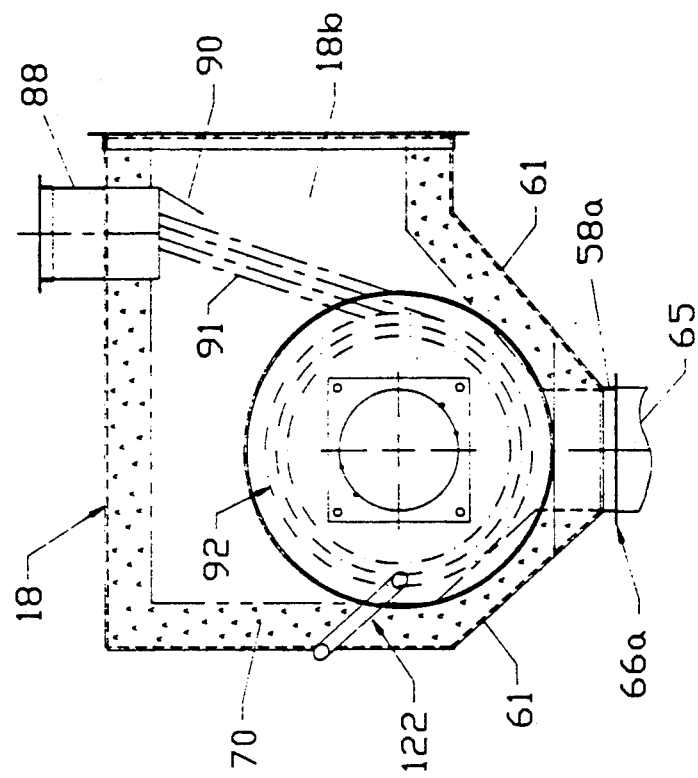
FIG. 8 is a vertical section through the center of the firebox as shown in FIG. 7.

Referring particularly to FIGS. 3 and 8, the soil outfeed or discharge conveyor unit 14 is located with a vertical inlet tube 65 projecting upwardly from frame 33 into alignment with the discharge tube 58a of the firebox 18. The soil outfeed conveyor unit 14 is a screw-type conveyor including a conveyor tube 66 fixed to the tube 65 and releasably mounted by a suitable swivel support 66a to the outlet tube 58a. The conveyor tube 66 projects at an angle from the inlet tube 65 upwardly. A feed screw 67 is mounted within the conveyor tube 66 and carries the clean soil 3 upwardly to an upper or top discharge opening through which the soil is discharged to a suitable receiver 68a. A motor and reduction gear unit 68 is secured to the outer end of the conveyor tube 66 and continuously drives the feed screw during the operation of the apparatus. The receiver 68a may be a conveying mechanism or the like for appropriate return of the soil directly to the site or otherwise used. The reclaimed soil can of course be transported from the treating location to a remote location, as required.

In the preferred illustrated construction, the conveyor unit 14 is pivotally mounted to the frame 33 as by a pivotal mount 66a which secures the conveyor inlet tube 65 of the conveyor unit 14 to the end of the outlet tube 58a. The mount 66a permits limited angular orientation of the outfeed conveyor unit 14 with respect to the treating apparatus. A swing arm 69 is pivotally secured adjacent the firebox and drum. Arm 69 is shown as a rigid rod member, the inner end of which is mounted on a pivot pin 69a on the top of firebox 18. The arm 69 extends outwardly to the side of the drum and firebox assembly. A suitable coupling member 69b, such as a two-piece rod with a turn buckle connection, is releasably secured to the arm 69 and to the outer end of the conveyor tube 66 and supports the conveyor unit 14 in anyone of a plurality of angular locations, including a lateral side extension or in an in-line rearward alignment from the drum 6. The output or discharge conveyor unit 14 is thus releasably mounted and is removable for over-the-road transport in the illustrated embodiment.

The soil 3 is thus treated by a single pass through the drum, although if desired the soil could be recycled. As previously described, the treated gas mixture including the gaseous contaminants and any minute soil products or fines are recycled through the firebox 18 and drum 6, where the gaseous contaminants form a part of the flame 13 which is projected into the drum 6 and the atmosphere within the drum for establishing essentially substantial, if not total, incineration of volatile matter within the drum atmosphere.

Figure 7:
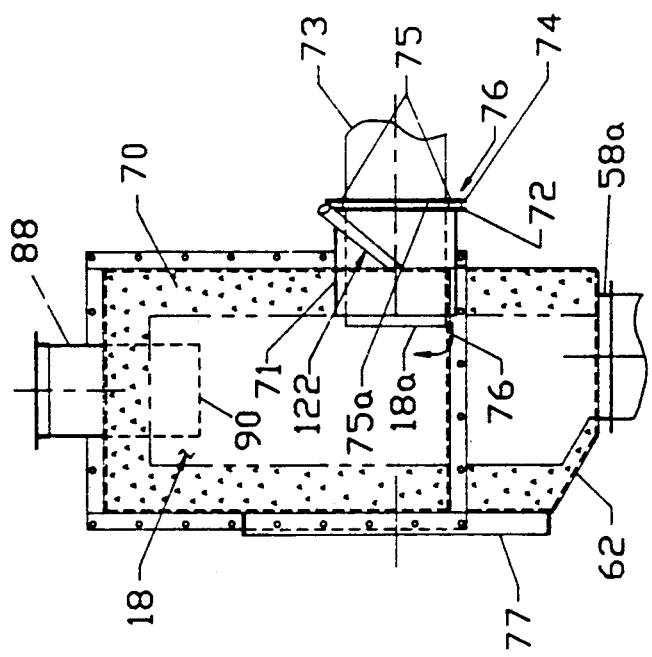
FIG. 7 is a vertical section through the firebox unit shown in FIGS. 1-3, inclusive.

Referring to FIGS. 7, 8 and 13, the firebox 18 is a heavy metal box member secured in slightly spaced relation to the end wall or plate of the rotating drum 6. The firebox 18 is lined with a high temperature insulation such as a hardboard burner insulation 70, and defines a relatively small firing chamber generally aligned with the drum discharge and coupling tube 58 of the drum 6. The outer end wall of the box includes a burner opening aligned with the axis of the drum and the coupling tube 58. In accordance with a significant aspect of the invention shown in FIG. 7, a coupling tube 71 is mounted in the opening of the box and projects inwardly to define a protective enclosure for the burner nozzle 18a. The tube 71 in accordance with the preferred construction also projects outwardly and terminates in a burner mounting flange or plate 72. The burner housing 73 includes a mounting plate 74 which is secured to the tube plate 72 with spacers 75 located at the plate corners. A small air gap 75a is thus formed permitting air to move inwardly about the burner tube and nozzle 18a. The burner nozzle projects inwardly in slight inwardly spaced relation to tube 71. The fuel pump and blower forming a part of burner unit 11 are mounted to the exterior of the plate 74 to complete the burner unit 11.

The air 76 flowing inwardly between the tube 71 and the nozzle 18a serves to cool the burner nozzle and also the external components of the burner in outwardly spaced relation to the high temperature burner box. The air cooled system contributes to the life of the burner unit and particularly the nozzle. The mounting system also permits a combination of different size burners using a simple adapter plate 74.

Referring to FIG. 13, the burner firebox 18 is mounted to the end of the drum in slightly space relation thereto, with the burner nozzle in substantial alignment with the drum axis. A coupling tube 77 extends inwardly from the wall of the firebox adjacent the end wall of the drum. The inner surface of the coupling tube 77 is ground flush to provide a relatively smooth coupling surface in telescoped relation to the drum coupling tube 58. The diameter of the burn box tube 77 is slightly greater than the external diameter of the drum coupling tube 58. The gap or space 78 provides a small but significant oxygen supply path immediately adjacent to the discharge side of the firebox 18 for supply of additional oxygen to the flame structure.

Ignition of the gas from the burner nozzle generates flame 13 which is projected well into the drum 16, and under normal operating conditions the flame 13 may project a distance of three feet into the drum. The burner flame 13 is concentrated within the center part of the drum 6 and within the rotating flights or vanes 9 and paddles 55 and rapidly increases the temperature of the air drawn in through the blower structure to provide a high temperature drum atmosphere, particularly in the region adjacent the discharge end portion of the drum. The soil at the discharge end of the drum 6 is at the maximum temperature and for general petroleum-based product contaminated soil and the like generally above 400° F., as previously discussed. The air and volatile gases driven off within that high temperature atmosphere are at least partially ignited to effectively initiate destruction of the contaminants, thereby further contributing to the high temperature condition within the drum.

The atmosphere is drawn outwardly through the drum to the inlet end box 16 as result of the pressure differential created by the blower 17 in the recycle line 15. The hot gases thus move through the drum engaging the cascading soil 3 to continuously heat the soil and drive off volatile contaminants, some of which will be incinerated and other parts of which will be carried with the gases through the recycle line 15. Due to the moisture and condition of the soil and the length of drum 6, the soil 3 adjacent the inlet end 7 and inlet box 16 and even extending well into the drum from the inlet and will cool the gases resulting in the heating of the soil sufficient to remove some but lesser amounts of volatile contaminants and further without incineration as the gas mixture moves through that portion of the drum 6. The gas mixture is thus withdrawn through the recycle tube or line 15 and redelivered to the firebox 18.

Referring to Figs. 1, 2, 9 and 10, the recycle tube 15 is essentially a closed passageway having its inlet end connected to the top wall of the inlet box 16 and the terminal end to the top wall of the firebox 18. The connection to the inlet box 16 is shown to one side of the inlet box. The location is not critical and is generally selected in accordance with the provision of other equipment in the system. The tube 15 includes a vertical portion 80 extending upwardly from the inlet box 16 and a horizontal portion 81 coupled thereto immediately above the drum and projecting toward the rear of the drum. The inlet end of recycle tube 15 is flanged and bolted to a coupling flange at 82 on the box 16 to provide a sealed connection. A damper unit 83 is located in tube portion 81 at the blower fan inlet of fan 17 to set the level of air through the recycle tube 15.

The horizontal portion 81 of the recycle tube 15 projects outwardly from the connection to portion 80 and is sealed by a removable, clean-out cap 84. Fines may be carried with the gas mixture into the recycle line or tube. Due to the turning of the air flow, heavier fines may tend to leave the gas mixture and deposit within the recycle tube portion 81. The releasable cap 84 provides a convenient access for cleaning out the tube fines.

The tube portion 81 extends over the length of the drum 6 and is connected to the inlet of the blower 17. The blower 17 is shown as a well known centrifugal-type blower having a central inlet and a peripheral outlet. The outlet of the blower 17 is connected to a horizontal tube portion 85 as by a flanged coupling and is a continuation of the recycle tube. The outer end of tube portion 85 terminates in a offset vertical tube portion 87 secured to the top of the firebox 18 for recycling and for discharge from the drum.

The top of the burner firebox 18 is provided with a coupling tube 88 welded or otherwise sealed within an appropriate opening in the box. The tube 88 projects upwardly and terminates in a gasketed flanged connection 89 to direct the recycled atmosphere inwardly into the burner firebox 18.

As most clearly shown in FIG. 8, the coupling tube 88 is located to the one side of the burner opening and directs atmosphere inwardly towards the nozzle area of the flame 13 but to the one side of the flame 13 in box 18. In a preferred construction, a shallow deflector plate 90 is secured to the exterior side of the coupling tube and adjacent the collection and discharge unit 18a of the firebox 18. The plate 19 directs the gas mixture toward the edge of the flame 13 within the burner firebox, as at 91. The gas mixture circles around the burner box 18 and around the outer edge area of the nozzle and flame 13, developing a circular path around the flame 13, shown most clearly in FIG. 8. The gas mixture is ignited by the initial burner flame 13 and generates a generally doughnut shaped flame 92 within the firebox 18, which is projected into the drum 6 by the burner blower, and thus form a part of the flame 13. The small air gap 78 (shown most clearly in FIG. 13) between the drum coupling tube 58 and the burner coupling tube 77 introduces a source of additional air and oxygen into the annular, doughnut-shaped flame 92. Depending upon the temperature conditions of the soil 3 and the volatile conditions in the soil passing through the drum 6, the doughnut-shaped flame 92 can be self-supporting and the burner flame 13 is reduced and actually shortens up. In highly contaminated soil, the burner flame may become non-existent because of the self-supporting nature of the flame 92 without reducing the effective incineration of the gaseous mixture within the atmosphere in the multi-pass incineration drum 6.

Generally, in practical installations, it has been found that total incineration of the contaminants may not be created in the incineration drum 6. At least a small level of contaminants are then withdrawn with the incineration treated gases from the system at the coupling or collector unit 18b of the firebox 18 and treated in the scavenging or final burn unit 19. Generally, in a practical installation, at least about 60% of the released soil contaminants are destroyed in the incineration drum 6, and more generally incineration on the order of about 60 to 80% and higher can be anticipated under normal operation of the drum, in accordance with the teaching of the present invention. The small balance or trace of the contaminants are destroyed within the burn unit 19.

Figure 10:
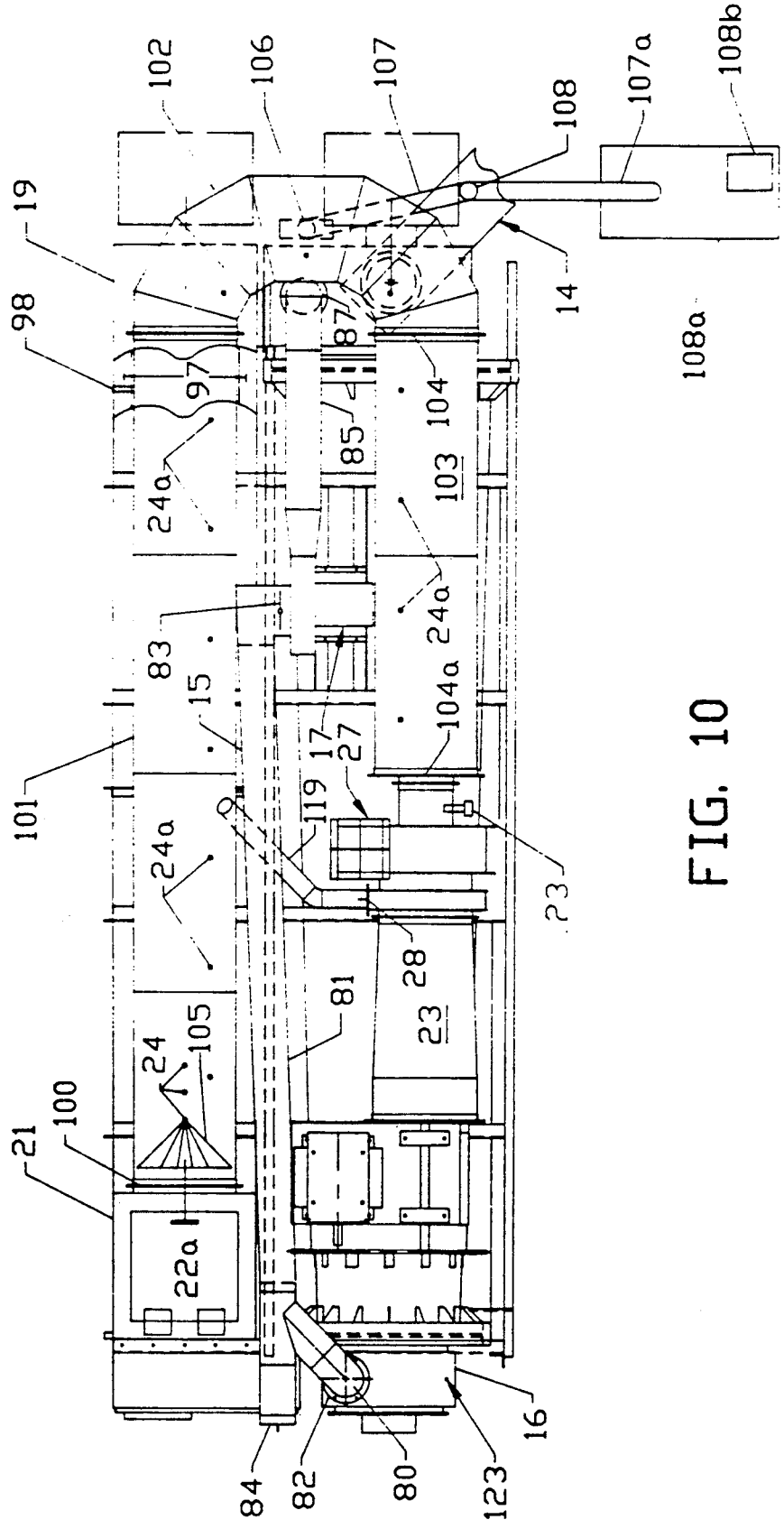
FIG. 10 is an enlarged plan view with parts removed to more clearly illustrate the structure of the invention.

As shown most clearly in FIGS. 2, 3 and 10, unit 19 is basically a large rectangular metal burn box 94 which runs throughout the length of the apparatus including the firebox 18 and the drum 6. The hot burn box 94 is secured at the bottom wall to the frame 33 and extends upwardly therefrom generally to the top surface of the large end of the drum 6. The burner unit 20 is mounted directly to the end wall of the burn box 94 and generally in alignment with the burner unit 11 for ease of assembly with a common support structure 95 for the two burner units 11 and 20. The vertical end walls of the burn box 94 are also provided with a clean out door 96, shown in FIG. 3, permitting entrance into the burn box from the opposite ends for removal of accumulated solid particulate. The burn box 94 is lined with high temperature insulation 97 which is mechanically secured by securement pegs 98.

The burner 20 serves to increase the temperature of the hot gaseous mixture or atmosphere within the large box 94 to a relatively high temperature. Thus, the recycled gases are at a relatively high temperature and being drawn off from the side of the firebox 18 extending downwardly to the lower end encompassing the drum opening and will tend to exit the gaseous atmosphere at a relatively high temperature. The temperature in the burn box 94 will generally be in a range of 1300° F. to 1600° F. with the product resident time insuring complete incineration of any remaining volatile matter and particularly contaminant substances. In addition, this high temperature will insure that any fines in the gaseous atmosphere are completely stripped of any volatile matter and the contaminant destroyed within the large burn box 94. The temperature in the final burn box is preferably monitored by a suitable thermocouple 99 shown located within the discharge or transfer box 21 of unit 19 to insure that the temperature condition in the burn box is at the desired incineration temperature or state. Although all of the volatile substances in the exiting atmosphere from box 94 should be essentially, completely eliminated, further insuring this condition may be established, if necessary, by recycling of the atmosphere from the burn box, preferably back to the firebox 18 for further recycling through the incineration drum system. The thermocouple 99 is preferably connected through a suitable control to modulate the operation of the burner unit 20 secured to the inlet end of the burn box 94.

The opposite or discharge end of the burn box terminates adjacent to the small end of the drum 6 with the transfer box 21 coupled to the quench unit 22 to discharge the hot atmosphere into the quench unit 22.

The U-shaped quench unit 22 includes a generally constant diameter piping system secured to the inner wall of the transfer box 21 in a sealed connection by a flanged coupling 100, as shown in FIG. 10. The piping of unit 22 includes a relatively large diameter pipe, such as a 23 inch diameter, which extends as a relatively rigid pipe 101 over the center of the unit 19 with a U-shaped end pipe 102 connected by a flange coupling to the pipe 101. The U-shaped pipe 102 extends laterally over the drum 6 and adjacent firebox 18 and terminates in a horizontally reversed connection within the confines of the frame 33, and particularly generally overlying the opposite side of the drum from the transfer burn unit 19. A relatively short exit pipe 103 is secured by a flanged coupling 104 to the end of the U-shaped pipe 102 and projects forwardly toward the forward end of the drum and approximately to the center of the drum where it is connected by flanged coupling 104a to the separator unit 23.

As previously noted, spray nozzle 24 is mounted within the pipe wall of the quench tube and establishes a water spray within the piping. As more clearly shown in FIG. 10, a spray 105, which is a generally conically-shaped spray, is formed by nozzle 24 immediately adjacent the box 21, Spray 105 is directed toward the incoming flow or the upstream flow from the transfer box 21 into quench unit 22. The water spray 105 provides for thorough mixing with the gases and any remaining fines in the gas mixture atmosphere during its flow through the quench unit 22.

Water and fines which drop from the gaseous mixture will accumulate in the quench unit 22. A drain spigot 106 is located in the center of the end tube 102. The two opposite end pipes and the U-shaped pipe are tilted or inclined slightly to form a low point in the U-shaped tube 102, at which point the spigot 106 is located, as shown in FIGS. 3 and 10. Any moisture or water or fines accumulating within the quench piping drain to the spigot 106 which is located at the lowest horizontal position. A drain hose 107 is connected to the spigot and extends downwardly therefrom to the upper end of the soil discharge conveyor unit 14. In the illustrated embodiment of the invention, the drain hose connecting spigot 106 is located immediately forwardly of the firebox and the hose 107 extends downwardly therefrom around the blower and outer parts of unit 11 to the inlet end portion of the outlet conveyor tube 66.

The outlet spigot 106 is preferably provided with a water jet unit 106a to propel the moisture and solid materials into and through the drain hose 107. A receiving spigot 108 is secured to lower end portion of the conveyor tube of unit 14 to which the hose 107 is releasably secured. The accumulated water is discharged through the hose 107 and serves to cool the soil. Solid material, such as fines, which has been carried by the water will flow outward through the hose to the discharge conveyor for discharge with the treated soil. The water will reduce the temperature of the soil and reduce fugitive dust in the discharge material.

Additionally, the gases may be cooled and the fines in the gases passed to the separator 23 reduced by providing significant cooling water through the nozzle 24a. The volume of water and fines withdrawn from the quench unit 22 is not practically discharged through the outlet conveyor unit 14. An alternate discharge line 107a is shown coupled to the quench unit 22 in this embodiment such that the water and fines are partially discharged to the conveyor unit 14 to cool the discharged soil and the balance discharged to a separate unit shown as a setting unit 108a. The fines settle in the unit 108a and the water is preferably recycled to the quench unit 22 and/or to the separator 23. The receiver 108 may include a pump 108b, the outlet of which is connected to the main water supply for recycling of the water.

The quench tube structure is supported by a plurality of supporting frame structures (FIG. 9), each including a pair of laterally spaced vertical members 109 secured to the opposite sides of the frame 33 and interconnected by top cross beams 110. Longitudinal side braces 111 interconnect the vertical members to increase the rigidity and support of the relatively heavy structure including the quench unit 22 and the separator 23.

The separator 23 as previously noted is any suitable unit adapted to separate solid material and moisture globules within the exiting gas mixture from the quench unit and to separately discharge the moisture and fines via duct 119 from the remaining gases which then may be discharged directly into the atmosphere or the like.

Figure 11:
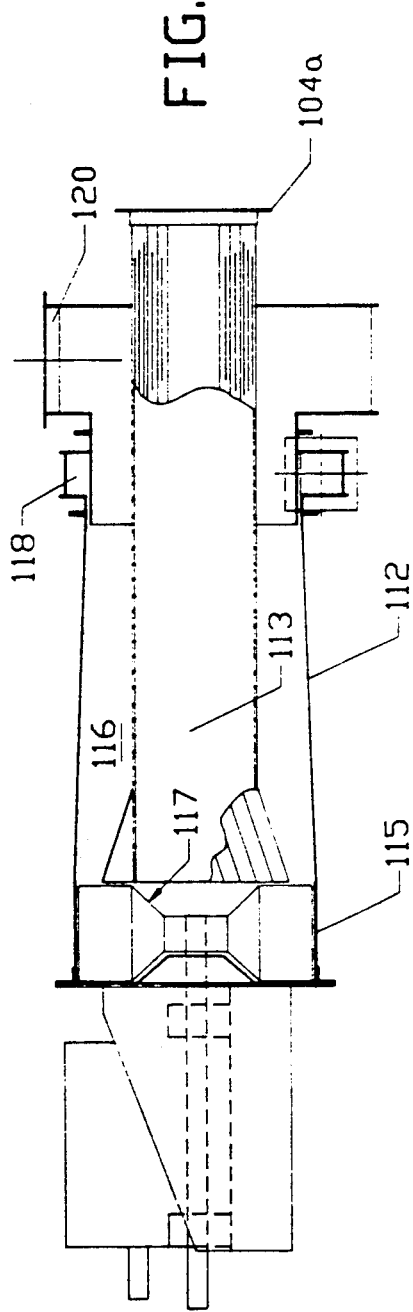
FIG. 11 is an enlarged view of the cylone separator shown in FIGS. 1-3, inclusive.
Figure 9:
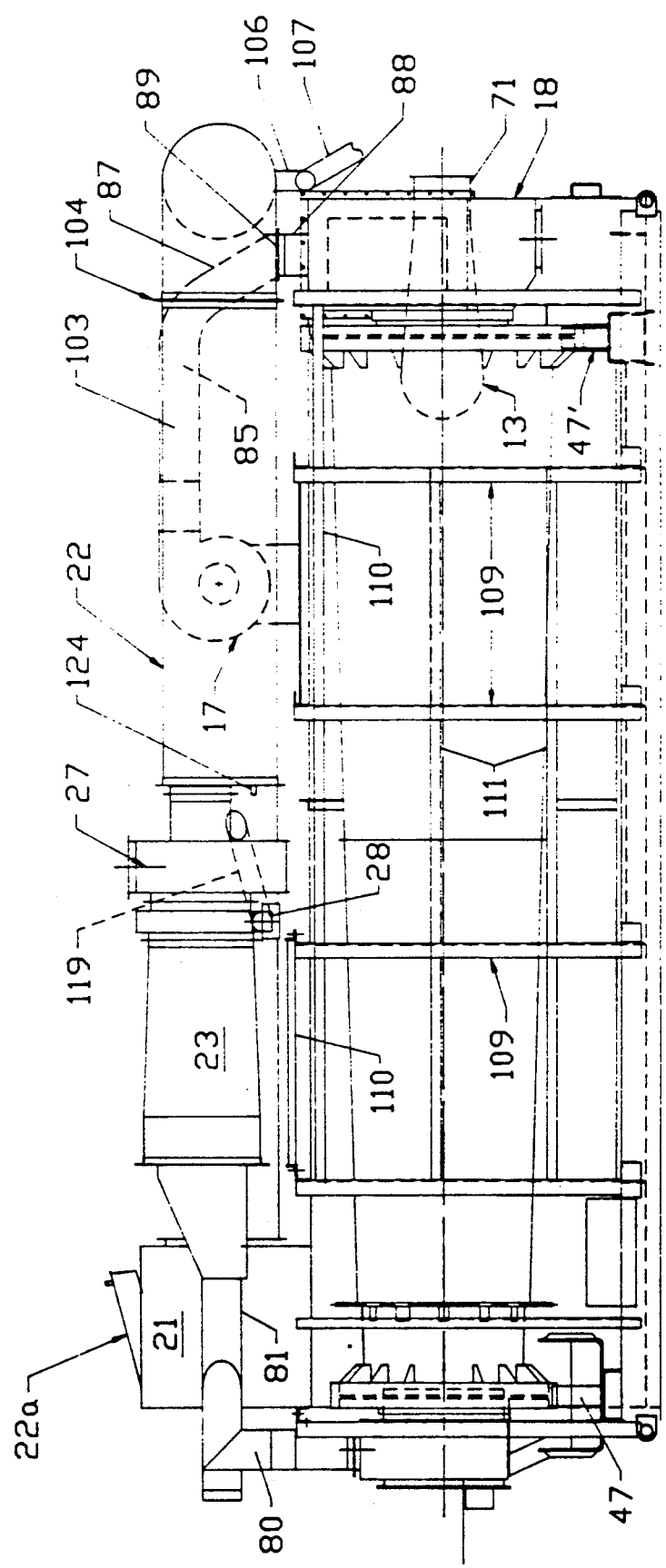
FIG. 9 is an enlarged side elevational view of the apparatus as shown in Fig. 1 with the input conveyor unit, burner unit and the outlet conveyor unit removed.

As more fully shown in FIG. 11 and the previously referred to U. S. Pat. No. 4,357,152, the separator 23 preferably includes an outer conical housing 112 which is supported by the superstructure generally in-line with the quench exit tube 103. A cylindrical inlet tube 113 projects from the outer conical housing 112, and is interconnected to the end of the quench tube 103 by the sealed flanged coupling 104a. The tube 113 tube extends throughout the housing 112 and terminates adjacent to a cylindrical end housing 115 forming a transfer passageway into a centrifugal reverse passageway 116 between the conical housing 112 and the constant diameter inlet tube 113. A blower 117 is mounted within the cylindrical housing 115 and operates to create a high pressure draft with a negative pressure in the inlet tube, thereby pressuring the complete system back to the firebox 18. The cyclone separator blower 117 is preferably constructed with a cooling blade for cooling the bearing structure and increasing the acceptable operating temperatures of the unit. With the final burn unit 19 operating at a temperature in the upper ranges, a cooling water spray nozzle 117a coupled to the water pump unit may be mounted in the entrance inlet of the cyclone separator 23 to insure proper final cooling of the gases. Nozzle 117a serves to establish an atomized fog spray and add liquid to the particulate for improved separation and liquify the skimmed product for improved flow from the separator. The added liquid also serves to minimize build up of solids within the separator. The blower 117 draws the gas mixture including the fines through the unit 19, the quench unit 22 and the separator 23 and directs the flow through the centrifugal passageway 116. Within the reverse passageway 116, the moisture and fines are driven to the outer conical surface and move with the air along the conical surface. The fines and moisture are discharged through a skimmer opening at the end of the conical housing and are withdrawn through the encircling skimmer passageway unit 118 such as to the discharge conveyor unit 14. The skimmed material can be directly discharged but is preferably recycled into the inlet end of the quench unit 22, as follows. The skimmer discharge unit 118a is located beneath the separator housing 112, as shown in FIGS. 9 and 10, and faces the quench tube 101. A connecting duct or pipe 119 is connected to the skimmer outlet and to an inlet opening provided in the side of the quench tube 101 to discharge the moisture and fines via the hose 107.

The separated gases in separator 23 are discharged axially about the inlet tube into a centrifugal discharge unit 120 connected to the outlet end of the reverse passageway. The exhaust outlet is shown projected upwardly for directing of the exhaust gases directly into the outdoor atmosphere, in accordance with acceptable procedure.

The system thus provides a thorough and effective cleaning with at least substantial incineration within the rotating drum 6, followed by any necessary processing to remove final traces of contaminants as well as the fines in the treated gases.

The recycle blower 17, as previously noted, creates a negative pressure condition between the inlet end of the drum 6 and the burn box 94 as well as firebox 18. The blower 117 of the separator 23 similarly creates a negative pressure condition between the separator and the firebox. Generally, as previously noted, the negative pressure created in the drum 6 will operate to recycle a substantial level of the gaseous atmosphere through the drum 6 to effect incineration of at least significant contaminant levels. A portion of the gaseous atmosphere is drawn off and passed through the unit 19 to the separator 23 for final discharge of the cleansed volatile matter. The separator 23, and particularly the motor driven fan unit 117, is modulated to establish the desired negative pressure within the box unit 19, the quench unit 22 and the separator 23 in relationship to the negative pressure condition created by the recycle blower unit 17. The two units 17 and 117 thus jointly control the flow into and through the system to provide the desired necessary recirculation of the atmosphere to the firebox 18 and drum 6, and through the burn box 94 of the final processing system for discharge of the cleansed water vapor and air to the atmosphere. The mounting of the final burn unit 19 in parallel aligned relationship to the firebox 18 also provides an inherent safety factor in the event recycling blower unit 17 should fail or the like. The negative pressure condition established by the blower unit 117 of separator unit 23 will draw the flame and gaseous mixture directly into the final burn unit 19 and thereby prevent escape from the system. By monitoring the condition of the two burners and the two blower units, sufficient time can be provided to shut down the system, if required.

Optimum operation of the system is dependent upon a number of different factors including the temperature of the discharged soil, the temperature of the recycled gases and the interrelated or appropriate flow of material into and through the drum. In addition, the water must be critically supplied to the quench system to insure the proper cooling of the hot gases to prevent destruction of the separator and separation of solid matter components, and the several burners and blowers must be functioning properly.

Further, control of the burners to minimize fuel consumption and optimize the usage of the recycled volatile gaseous contaminants is desirable to increase the efficiency of the operation of the apparatus.

In the illustrated embodiment of the invention, the input conveyor motor unit is a variable speed motor to allow varying of the feed rate of the soil 3 in accordance with the effective operation of the apparatus. The effectiveness is measured by monitoring the temperature of the recycled gases at the inlet box 16, which produces a signal indicative of the temperature of the discharged soil at the burner firebox 18.

The discharge gases should be at a certain selected minimum temperature under normal system operation. The temperature of the exiting atmosphere, which will include air, a gas mixture created by the remaining volatile substances, as well as small particulates or fines, should, for optimum operation, be maintained at a minimum temperature level. Applicant has found that monitoring of the temperature of the exiting atmosphere from drum 6 provides a practical method of controlling the temperature of the discharged soil 3 and the proper atmosphere within the drum. Thus, as the contaminated product soil is introduced into the drum, the product is at a relatively cool temperature and, as it moves through the drum, progressively increase in temperature. Conversely, the increase in temperature results in a cooling of the atmosphere. The temperature differential will vary with the characteristic of the soil depending on such parameters as its moisture content, original in-feed temperature, and outdoor temperature and the like. The necessary heat to increase the soil temperature and maintain the incineration characteristic for the contaminant substances within the drum will require control of the heating source and/or the flow rate of the material. A thermocouple unit 121 is shown mounted in the inlet box 16 and preferably as shown in the top wall to the opposite sides of the box to the gas recycle line connection. In a practical application, if the atmosphere may drop below a temperature of approximately 200° F., the temperature within the drum 6 is probably not appropriate for contamination incineration and remedial action should be taken to insure that the gases being discharged are appropriately cleansed. If the monitored temperature thus varies within a particular range, burner 11 can be adjusted to automatically compensate for the soil temperature requirements and/or the speed of the infeed conveyor motor 40 can be decreased or increased to vary the soil subjected to the temperature conditioning thereby generally generating an increase or decrease in the temperature within the drum and the temperature of the soil. If the temperature of the discharging soil drops below a selected temperature or a selected temperature for a given time period indicating that the feeding system is not operating properly, the total system should be set down to terminate the feed of soil through the system. Once shutdown, manual adjustment is required until a minimum oil temperature is reached.

Although the temperature of the discharged soil 3 can be used directly to control the environment, thus, either by changing of the feed rate and/or by varying of the burner operation, the sensing of the exhaust atmosphere as the basic control components is preferred to prevent an undesirable lag in the varying of the control and the atmosphere within the drum 6. Thus, if the discharge temperature of the soil 3 is used as the control parameter, a significant quantity of soil may have been processed through the drum 6 without appropriate volatization and incineration of the contaminant substances when the soil reaches the discharge end 8 of the drum. This could require removable and separate processing of the discharged soil which is below the optimum operating temperature. By sensing the temperature of the exiting atmosphere, the adverse condition is determined while the soil condition is upstream of the discharged soil and at least more nearly adjacent the infeed end of the drum; and as a result, corrective action may be taken to insure that such soil is properly treated in the downstream portion of the drum. In summary, there is a direct relationship between the exiting atmosphere's temperature and the temperature of the soil being discharged, which may provide for corrective action without the delay or lag which will be encountered if the soil itself is the control parameter. However, may be desirable to monitor temperature of the discharged soil 3 as a further check on the system operation. This temperature can be periodically monitored and logged as a quality control on the system operation. The total optimum operation of the system is related, of course, to the character of the product passed through the drum, and particularly to providing a product which is significantly divided or loose such that the product will drop and cascade through the drum structure. Even though, as originally fed into the drum, the contaminated product may tend to form large clumps, the drying action within the drum may create a proper cascading movement. If the product is not sufficiently loose or divided prior to introduction into the inlet conveyor unit or so created by the action within the conveyor so as to cascade through the drum, sand or other granulated-type material is preferably added to the incoming contaminated soil to condition it for effective cascading action within the rotating drum.

Generally, the discharged soil, which has been thoroughly decontaminated and heated to the high temperatures, is a relatively fine granular product. If desired, the granular product can be fed back into the inlet hopper or other supply source and intermixed with the contaminated soil to condition the soil for proper processing through the drum. As usual herein, contaminated soil or like product is defined as a sufficiently loose or divided material to cascade through the rotating drum.

The discharged soil temperature is also monitored as a final check on system operation, as follows in the illustrated embodiment. An infrared scanner 122 (FIG. 8) is mounted in the wall of the firebox 18. The scanner 122 is located to one side of the firebox and projects inwardly with an inner lens for scanning the spaced surface of the soil 3 as it moves from the flame 13 down the inclined wall of the firebox 18. The soil is thus preferably discharged as a hot material and generally should be above 400° F. for optimum system operation in the described application. The hot soil 3 thus emits infrared energy. The infrared scanner provides a proportionate signal to the emitted energy.

As previously noted, the hot gases pass through the quench tube are to be significantly cooled in order to protect the separator 23. To insure such action, a thermocouple 123 is secured or coupled to the discharged end of the short quench tube 103 immediately at the connection to the separator unit 23. If the temperature of the exhaust gases is above a selected level, the cooling water supply is increased by water volume through nozzle 24; and shut down, if the temperature correction is not achieved sufficiently rapidly in order to prevent damage to the separator.

The spray nozzles 24 and 117a is preferably commercial nozzles which establishes a spray pattern which totally covers the cross section of the related quench tube 101 and inlet tube 113 at the connection to the burn box extension or transfer box 21 and to separator 23. The water supply to the nozzle 24 is modulated by a suitable motor-actuated valve unit 124. The valve unit 124 controls the volume of water supplied to the nozzles 24 and 117a and the intensity of the cone-shaped spray 105 to establish effective and efficient cooling of the gaseous atmosphere in accordance with the temperature of the exiting atmosphere into the separator. Although there may be a slight time lag between the sensing of the exiting atmosphere by the thermocouple 123 at the separator 23 and the varying of the cooling water supply at the unit 19, the action of unit 117a and the time delay associated with the gases moving through the quench unit 22 is sufficiently small that no operative adverse effect on the separator 23 will generally arise.

The water nozzles 24a are provided primarily for cleaning and need not be and generally are not of the variety corresponding to nozzle 24 for purposes of cost and functioning. The nozzles generally provide water jets rather than a mist- or cone-shaped spray to provide a more effective cleansing of the tube system.

In the illustrated embodiment of the invention, fourteen cleaning nozzles are illustrated and provided generally spaced on two foot centers. In a practical application, seven nozzles are provided within the pipe section 101, three nozzle 24a are provided in the loop section 102, and four nozzles are provided in the discharge section 103. Obviously, the number of nozzles 24a can be readily changed in accordance with the design of and product processed in the system. Further, the nozzles 24a are preferably provided with water to add liquid to the particulate for improved separation thereof within the quench tube unit 22 and the separator unit 23 including the improved flow of the particulate to the quench discharge outlet 186. The added water further serves to continuously clean the fines from the quench unit.

Further, in order to insure available cooling for the gases, the water supply is monitored by a pressure sensitive switch 125 coupled to the infeed line to the water pump 25. In the event, the water supply fails for any reason, the system will shut down and the operator can provide proper correction.

The continued operation of the various motors, blowers and burners can of course also be directly monitored to immediately respond to any failure in the system as a part of a total operative control system.

In addition to the several components indicated, the operation of the burners and the blower units are preferably continuously monitored. Thus, pressure switches in each of the burner blowers is preferably provided to insure operation thereof for the appropriate combustion within the burner nozzle. In addition, pressure switches in the supply gas line are preferably provided to insure appropriate gas pressure to the burner units. Similarly, pressure switches in the recycle blower and the separator blower unit are provided to sense the effective operation of such units. Finally, the rotation of the main drum is also preferably monitored, for example, as by a proximity switch to insure that the system is operating either at a minimum rotational speed, and preferably at the preset speed in the constant speed rotation drum described. The rotation of the exit conveyor screw is also preferably monitored as by a proximity switch to insure continuous withdrawal of the high temperature soil from the drum. Thus if for any reason the exit conveyor should fail, the soil would tend to build up within the firebox and then the drum creating an expensive and costly shutdown condition to clear and restart the system.

Further, in the operation of the system a sequential start procedure is preferably provided consisting of a start up from the discharge end of the system. Thus, rotation of the exiting conveyor unit is first started to insure that the material can be removed. The drum is then activated to rotate to insure product transfer from the input conveyor. The separator unit is actuated to insure creation of an appropriate pressurization of the final processing system and the recycle blower operated to insure the appropriate pressurization of drum. Then and only then is the burner unit to be operated, with a normal sequence of first purging of the system to remove any explosive gaseous environment prior to igniting of the gas via the pilot. Various devices can be interconnected directly into a safety interlock system to insure the appropriate sequential operation, either manually or in an automated start up system.

Thus, as previously noted, the system can use a suitable programmed logic control system for operating of the system. Alternatively, a manual control can be provided directly or as an override to a programmed logic control. In either system, a safety interlock is preferably provided within the system to insure proper start up with all components operating as required, as well as to provide an operating status indication during the operation of total proper system with shutdown in the event that the system operation does not properly process the product or creates a condition dangerous to the personnel or to the system components.

Where a programmed logic control is used based on current electronic technology, the environment within the control housing is also preferably monitored to insure that the temperature within the housing is within a safe operating temperature. Thus, with modern day control circuitry, various components may be highly temperature sensitive and to insure continued appropriate operation must be maintained operating within a particular temperature environment.

Further, the various controls as well as others are preferably contained within the control box 29 located adjacent to but spaced from the discharge end of the burn unit 19. Any suitable control can of course be provided including various hardware controls, programmable controllers or microprocessor based controls. In a preferred construction for maximum versatility and ease of operation, a suitable microprocessor control is provided for monitoring the state of the various signal devices and to adjust the soil rate, the water supply and the like as well as shut down of the apparatus in the event of abnormal conditions. A variable control also permits setting of the system for various states for various feed rates and temperatures depending upon the various known levels of contaminants to be treated.

Thus, the particular control will be dictated by the design specifications as well as the versatility and safety requirements to be built into the system as such. As various systems will be required and do not form a critical part of the present invention, no further description thereof is given.

Generally, the discharge conveyor unit 14 will be removed and carried separately on a portion of the trailer or through a separate vehicle. The in-feed conveyor unit 10 can also be removed as a unit for separate transport in a suitable small truck or otherwise mounted on the portion of the trailer. In addition, through appropriate construction, the hopper of the in-feed unit 10 can be releasably mounted as a part of the assembly. The in-feed conveyor unit 10 then can be released from inlet box 16 at the flanged mounting and projected into the drum structure through the inlet box and drum opening to provide a compact assembly with only the hopper and the discharge conveyor requiring separate trailer mounting or separate transport.

An alternate embodiment of the invention is shown in FIGS. 15 and 16. Referring particularly to FIG. 15, the skimmed particulate and water carrier is fed directly through a discharge system, as follows. A discharge line 126 is shown coupled to a separator outlet 127. The line 126 is extended along the top of the drum 6 to a collector 128, the outlet of which is coupled by a hose assembly, shown having one hose 129 to the outlet conveyor unit 14 and a second hose 13 to the receiver 108a. In this embodiment, the quench unit 22 may be solely discharged to the conveyor unit 14 to cool the soil.

The receiver unit 108a is shown as a baffled settling tank, with the solids collecting within the baffled chambers, and essentially clear water being drawn off the bottom by a pump 108b. The collector 128, as most clearly shown in FIG. 16, is a centrifugal unit having the inlet line 126 coupled to the upper end of the housing and a top air return line 131 to the quench unit 22. An inlet damper 132 in line 126 and a return damper 133 in return line 131 are set to balance the air flows for optimum separating of the particulate and water.

As shown in FIGS. 15 and 16, the U-shaped end pipe 102 may advantageously be formed as a square box-like member 134 having access doors 135 permitting direct access to the linear pipes 101 and 103 for cleaning. The bottom of the box is preferably tapered as at 136 to discharge opening 137 at the outer end corner adjacent the conveyor unit 14, for convenient coupling thereto. The linear pipes 101 and 103 are shown extended to locate the box 134 overlying the burner units 11 and 20 for maximum physical protection of the burner units.

Although disclosed as a constant speed drum 6, a variable speed drum may, of course, be provided if desired. The drum may also be otherwise constructed such as a constant diameter drum or a drum with specially constructed internal flighting for positively moving of the product through the drum. For example, a constant diameter drum might be used in the present invention; inclination of the drum could then be provided to create self feeding action of the product similar to that provided by the tapered drum. Alternatively, internal sprial flighting could be provided throughout the drum to positively carry the product through the rotating drum. The illustrated tapered rotating drum with the self feeding feature, as a result of the tapered construction, has been found to provide a highly effective and reliable means for processing of the soil with appropriate resident time within the drum structure. In a practical construction for soil reclamation, the drum 6 had a length of appropriately 20 feet with a small diameter at the inlet end of about three feet, and larger diameter at the discharge end of about three and one half feet.

Further, the illustrated embodiment has been described with the several motors described as suitably electric motors. Hydraulic motors may be used for all or any of the motors with a suitably hydraulically supply system provided. Other similar modifications may be made such as to the cooling and separating devices, the drum structure and the like.

Generally, the illustrated embodiment of the present invention has been used for the processing of contaminated soil products which are readily processed with the relatively low incineration temperature. Certain hazardous materials required destructive temperature in the order of 2300° Fahrenheit or greater. Although such product could be processed with the present apparatus by suitable special component construction, it is difficult because the drum may not provide the necessary incineration temperature to adequately destroy such hazard substances. A special afterburner construction and the like may provide a more practical apparatus with present day technology.

The present invention, in addition to the incineration of contaminants, can be applied to a simple dryer system for drying of products even though the volatile and/or burnable matter would not be considered a contaminant.

In this regard, it might be used in connection with drying of burnable materials. For example, paunch, manure products and seaweed, if dried, can be used as a source of fuel. By passing of such products through the rotating drum structure of the present invention with a dry product fired burner, the material can be passed through the drum structure, preferably in a counterflow sequence, and the dried material fed directly to the dry-fuel burner to function as a fuel source therefor. Thus, the basic approach of the invention as commercially developed discloses that the provision of a heating flame generated within the drum structure serving to simultaneously heat the environment within the drum and the product as such to result in a complete removal of volatile substances with the combined drying of the product and an incineration of the contaminant substances and removal of moisture and the like produces a discharged material for creation of the flame within the drum structure. In such a system, as well as in the basic system, an auxiliary burner supply is required to at least function as a pilot unit for igniting of the processed material.

Various modes of carrying out the invention are contemplated as being within the scope of the claims particularly pointing out and distinctly claiming the subject matter which is regarded as the invention.

I claim:

1. An apparatus for remedial treatment of contaminated products incorporating at least one volatile and burnable contaminant, comprising an incineration chamber unit, a heating unit connected to said unit and generating a flame projected into said chamber unit for driving said volatile substances from said product, a supply unit for introducing product into said chamber unit, said chamber unit being constructed and arranged to move said product through said chamber unit, a recycle system for drawing of the atmosphere including said volatile substances and fine particles within said chamber unit from said chamber unit and delivering at least a position of said withdrawn atmosphere including gaseous medium and particles substantially directly to said chamber unit for recycling thereof through said chamber unit for substantial incineration of said volatile substances, and a removal means coupled to said recycle system exiting the balance of said withdrawn atmosphere substantially free of said volatile substances from said chamber unit.

2. The apparatus of claim 1 wherein said chamber unit includes a drum rotatably mounted for continuous controlled rotation, said drum having an inlet end and a discharge end, said flame being projected into the drum, said heating unit being secured to said discharge end of said drum, said discharge end including a discharge tube projecting from the drum, said heating unit including a burner tube extended into said discharge tube, said discharge tube and said burner tube being constructed and arranged to form an air passageway therebetween for providing air and thereby oxygen to said flame.

3. The apparatus of claim 1 wherein said recycle system includes means to pass at least a portion of said recycled atmosphere into said flame and forming a combusted part of said flame.

4. An apparatus for remedial treatment of contaminated products incorporating at least one volatile and burnable contaminant, comprising an incineration chamber unit, a heating unit connected to said unit and generating a flame projected into said chamber unit for driving said volatile substances from said product, a supply unit for introducing product into said chamber unit, said chamber unit being constructed and arranged to move said product through said chamber unit, a recycle system for drawing of the atmosphere including said volatile substances within said chamber unit from said chamber unit and delivering at least a portion of said withdrawn atmosphere to said chamber unit for recycling thereof through said chamber unit for substantial incineration of said volatile substances, and a removal means coupled to said recycle system exiting the balance of said withdrawn atmosphere substantially free of said volatile substances from said chamber unit, said chamber unit includes a drum rotatably mounted for continuous controlled rotation, said drum having an inlet end and a discharge end, said flame being projected into the drum, said heating unit being secured to said discharge end of said drum, wherein said recycle system directs said recycled atmosphere in a path about said flame to ignite said volatile substances and create an annular flame projected into said drum.

5. The apparatus of claim 2 wherein said removal means includes a final processing system operable to remove essentially all remaining volatile substances and to separate moisture and solids in said atmosphere therefrom to discharge a contaminant free atmosphere.

6. The apparatus of claim 5 wherein said final processing system includes a burn box having a burner unit connected to said box to raise the temperature to a level to incinerate said remaining contaminants, and a material separator for removal of said moisture and solids from the discharge atmosphere of the burn box.

7. The apparatus of claim 6 wherein said processing system includes an atmosphere cooling unit connected between said burn box and said material separator, means for introducing water into said cooling unit, a recycle passageway unit connecting said separator to said cooling unit for discharging said moisture and solids into said cooling unit, and a drain unit connected to said cooling unit for removing of water and solids accumulating within said cooling unit from said cooling unit.

8. The apparatus of claim 7 wherein said separator is a centrifugal separator including a central inlet tube coupled to said cooling unit and having a reverse passageway surrounding said inlet tube and connected by a common transfer passageway, a suction blower mounted in said transfer passageway and operable to pass said cooled atmosphere through said passageway, said reverse passage having an outer tapered surface resulting an collection of moisture and solids in said atmosphere, said recycle passageway unit being connected to said skimmer unit.

9. The apparatus of claim 1 wherein said soil is heated to exit said chamber unit at a temperature in excess of about 400° F.

10. The apparatus of claim 2 wherein said drum is a rotary tapered drum having a narrow inlet end and a large outlet end with a tapered wall connecting said ends, said tapered drum having internal flight members secured to the internal surface and projecting partially inwardly and defining an essentially flight free passage through the center of said tapered drum, and means mounting said drum for rotation on a horizontal axis of rotation.

11. The apparatus of claim 10 wherein said flight members include archimedes screw flights in the drum adjacent the narrow inlet end and straight vanes extending from said screw flights, said flight members moving said product with a cascading movement through said tapered drum.

12. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases and fine particulate from said drum unit and directly delivering of a substantial portion of said atmosphere to said product inlet of said incineration drum unit including said flame to recycle substantial percentages of said atmosphere and at least in part cause said atmosphere to create said flame, and outlet means for exiting the balance of said atmosphere significantly free of contaminated substances from said chamber unit.

13. The apparatus of claim 12 wherein said product temperature exiting from said drum unit is in the range of an excess of approximately 400° to 800° F.

14. The apparatus of claim 12 wherein said temperature of said atmosphere within said drum unit is in the range of about 800° F. to 1300° F., said temperature being controlled in accordance with the contaminant product in said product.

15. The apparatus of claim 14 wherein substantially complete destruction of said contaminant substances is completed within said drum unit whereby said exiting atmosphere is substantially contaminant free.

16. The apparatus of claim 12 wherein said drum unit is substantially closed at the entrance end and the exit end, and said exit end including a passageway means for supplying of oxygen to said atmosphere adjacent said heating unit to increase and control the temperature within said drum unit.

17. In the apparatus of claim 12 including means to continuously monitor the temperature of said discharge product, feed control means for varying the feed of said product into said drum unit in accordance with said discharge temperature to maintain a predetermined product discharge temperature and thereby control removal and destruction of contaminant substances.

18. The apparatus of claim 12 wherein said drum unit includes a rotary drum having internal flight members secured to the internal surface and projecting partially inwardly to define an internal essentially flight free passage through the center of said drum, said conveying means including an in-feed product supply secured to the inlet end of said drum, a product discharge unit secured to the discharge end of said drum, said flight members tumbling said product in a cascading movement through said drum, said heating unit includes a high temperature burner unit secured to the discharge end of said drum and adapted to project a flame into and generally the center of said drum, and said recycle means directs said atmosphere into said burner unit and at least in part into said flame.

19. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases from said drum unit and delivering of said atmosphere to said incineration drum unit to recycle substantial percentages of said atmosphere, and outlet means for exiting the balance of said atmosphere significantly free of contaminated substances from said chamber unit, said drum unit includes a rotary drum having internal flight members secured to the internal surface and projecting partially inwardly to define an internal essentially flight free passage through the center of said drum, said conveying means including an in-feed product supply secured to the inlet end of said drum, a product discharge unit secured to the discharge end of said drum, said flight members tumbling said product in a cascading movement through said drum, said heating unit includes a high temperature burner unit secured to the discharge end of said drum and adapted to project a flame into and generally the center of said drum, and said recycle means directs said atmosphere into said burner unit, wherein said conveying means includes a variable speed conveyor removably affixed to the inlet end of said drum and operable to feed product into said drum at a fixed feed rate, said heating unit including a firebox secured to the drum with the discharge product being directed to fall through said flame.

20. The apparatus of claim 18 including discharge members secured to the discharge end of said drum, each of said discharge members having a generally L-shaped cross-section and having a first leg projecting inwardly from the inner surface of said drum and a second leg secured to the inner edge of said first leg and extending at an angle across said first leg, said second leg further extending circumferentially of said drum from said first leg, whereby said first leg carries product upwardly and said product falls therefrom onto said second leg, said second leg extending downwardly through said discharge end of said drum whereby said product moves downwardly on said second leg under the force of gravity into and through said flame.

21. The apparatus of claim 20 wherein said drum includes an outer tapered wall and a horizontal axis of rotation and a plurality of straight vanes secured to said wall and extending axially to said discharge end of said drum, said paddles having said first legs secured as extensions of said vanes.

22. The apparatus of claim 21 having said paddles secured to less than all of said vanes.

23. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases from said drum unit and delivering of said atmosphere to said incineration drum unit to recycle substantial percentages of said atmosphere, and outlet means for exiting the balance of said atmosphere significantly free of contaminated substances from said chamber unit, said drum unit includes a rotary drum having internal flight members secured to the internal surface and projecting partially inwardly to define an internal essentially flight free passage through the center of said drum, said conveying means including an in-feed product supply secured to the inlet end of said drum, a product discharge unit secured to the discharge end of said drum, said flight members tumbling said product in a cascading movement through said drum, said heating unit includes a high temperature burner unit secured to the discharge end of said drum and adapted to project a flame into and generally the center of said drum, and said recycle means directs said atmosphere into said burner unit, wherein said outlet means includes a scavenging burn assembly including a box structure adjacent one side of said drum and extending substantially the length of the drum and upwardly from the flame substantially to the upper level of said drum, a quench unit located in a substantially horizontal plane above said drum and box-like structure, a tubular particle separator secured to the discharged end of said quench unit and located in substantially the same plane as said quench unit.

24. The apparatus of claim 23 wherein said recycle means includes a recycle tube located within said quench unit and on the plane of the quench unit, said recycle tube being secured to the inlet end of said drum and to the burner unit, a blower unit secured in said recycle tube and operating to draw the atmosphere from said drum and delivering said atmosphere directly into said burner unit with said recycled atmosphere directed to said burner.

25. The apparatus of claim 23 wherein said quench unit includes a U-shaped tubular member having an inlet end secured to the burn box structure and extending to the discharge end of said drum with a U-shaped connection to a discharge portion of said quench tube extending to approximately the center location of said drum.

26. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases from said drum unit and delivering of said atmosphere to said incineration drum unit to recycle substantial percentages of said atmosphere, and outlet means for exiting the balance of said atmosphere significantly free of contaminated substances from said chamber unit, said drum unit includes a rotary drum having internal flight members secured to the internal surface and projecting partially inwardly to define an internal essentially flight free passage through the center of said drum, said conveying means including an in-feed product supply secured to the inlet end of said drum, a product discharge unit secured to the discharge end of said drum, said flight members tumbling said product in a cascading movement through said drum, said heating unit includes a high temperature burner unit secured to the discharge end of said drum and adapted to project a flame into and generally the center of said drum, and said recycle means directs said atmosphere into said burner unit, and including a discharge conveyor unit having an inlet tube located in alignment with the bottom burner unit, means to rotatably mount said inlet tube to said discharge tube receiving of product from said burner unit, said discharge conveyor unit includes a tubular housing with an internal feed screw and secured to said inlet tube, said housing extending upwardly from said inlet tube, a support unit secured to the burner unit and to said housing, and said support unit being movable in a horizontal plane to rotate said housing and inlet tube.

27. The apparatus of claim 24 including a water pump having an output connected to said quench unit to supply water to said quench unit for treatment of said atmosphere from said burn unit, a drain unit connected to said quench unit and to the discharge conveyor.

28. The apparatus of claim 27 wherein said separator includes a skimmer for separating moisture and solid from said atmosphere, and a passageway unit connecting said separator skimmer to said quench unit for recycling of the moisture and solids to said quench drain unit.

29. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases from said drum unit and delivering of said atmosphere to said incineration drum unit to recycle substantial percentages of said atmosphere, and outlet means for exiting the balance of said atmosphere significantly free of contaminated substances from said chamber unit, said drum unit includes a rotary drum having internal flight members secured to the internal surface and projecting partially inwardly to define an internal essentially flight free passage through the center of said drum, said conveying means including an in-feed product supply secured to the inlet end of said drum, a product discharge unit secured to the discharge end of said drum, said flight members tumbling said product in a cascading movement through said drum, said heating unit includes a high temperature burner unit secured to the discharge end of said drum and adapted to project a flame into and generally the center of said drum, and said recycle means directs said atmosphere into said burner unit, and wherein said in-feed-product supply includes an inlet conveyor unit having tubular conveyor housing and a feed screw rotatably mounted within said tubular conveyor housing, said screw forcibly propelling the product into and through said conveyor housing, the flights within said housing being constructed to break up said product passing through said housing.

30. The apparatus of claim 29 wherein said inlet conveyor unit includes an electrical drive motor connected by a speed reduction coupler to said feed screw, said drive motor being an A.C. variable speed, variable frequency motor wherein the motor speed is controlled by varying the frequency of the power supply to said motor.

31. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases from said drum unit and delivering of said atmosphere to said incineration drum unit to recycle substantial percentages of said atmosphere, and outlet means for exiting the balance of said atmosphere significantly free of contaminated substances from said chamber unit, wherein said drum includes a forward wheel secured to the forward end of said drum and rear wheel secured to the rear end of said drum, each of said wheels being a solid metal wheel integrally connected to said drum, a front guide wheel assembly secured to said frame and including trunions supporting said forward wheel and horizontal guide members engaging the opposite edges of said forward wheel to axially support the drum on said frame, a rear wheel assembly secured to said frame and including trunions supporting said rear wheel, said rear wheel being axially movable whereby said drum may expand and contract relative to said front guide wheel assembly.

32. The apparatus of claim 31 wherein said rear wheel includes a flame welded to said drum and an outer wheel rim engaging said rear guide wheel assembly, gusset members secured to said flange and rim to strengthen said wheel and functioning as cooling four members, said flange having openings to increase the air flow over said rear wheel.

33. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases from said drum unit and delivering of said atmosphere to said incineration drum unit to recycle substantial percentages of said atmosphere, and outlet means for exiting the balance of said atmosphere significantly free of contaminated substances from said chamber unit, including an outer high temperature insulation blanket covering said drum, and having an outer protective metal shell covering said insulation.

34. The apparatus of claim 33 wherein said drum includes a drive sprocket adjacent the inlet end of said drum, and said drum includes an outer supporting ring, said ring located from centrally between said sprocket and said discharge end of said drum whereby said insulation blanket and metal shell have equal lengths to the opposite sides of said ring.

35. A compact mobile apparatus for remedial treatment of soil and like contaminated products incorporating volatile and burnable contaminants, comprising an incineration drum unit rotatably mounted for continuous controlled rotation, said drum unit having a product inlet end and a product discharge end, a heating unit connected to said drum unit and adapted to generate a flame projected into said drum unit and creating an incineration temperature sufficient to drive said volatile substances from said product and to incinerate significant portions of said substances and to create an incinerating atmosphere within said chamber unit, conveying means for supplying product in a substantially continuous flow into said unit, said drum unit including means for tumbling of said contaminated product through said drum unit and exposing of the tumbling contaminated product to said ambient incinerating atmosphere within said drum unit, recycle means for drawing of said atmosphere from within said chamber unit and thereby withdrawing of said volatile substance gases from said drum unit and delivering of said atmosphere to said incineration drum unit to recycle substantial percentages of said atmosphere, and outlet means for exiting the balance of said atmosphere significantly free of contaminated substances from said chamber unit, including discharge members secured to the discharge end of said drum, each of said members having a generally L-shaped cross-section having a first leg projecting inwardly from the inner surface of said drum chamber unit and a second leg located as being secured to the inner edge of said first leg and extending at an angle across said first leg, said second leg further extending circumferentially of said drum from said first leg, whereby said first leg carries product upwardly and said product falls therefrom onto said second leg, said second leg extending downwardly through said discharge end of said drum whereby said product moves downwardly on said second leg under the force of gravity.

36. The apparatus of claim 35 wherein said drum includes an outer tapered wall and a horizontal axis of rotation and a plurality of straight vanes secured to said wall and extending axially to said discharge end of said drum, said paddles having said first legs secured as extensions of said vanes.

37. The apparatus of claim 36 wherein having said paddles secured to less than all of said vanes.

38. The apparatus of claim 35 wherein said second legs discharge said product directly into said flame.

39. A compact portable soil reclamation apparatus comprising a base support frame, a rotating drum rotatably mounted on said base support frame, an infeed conveyor removably affixed to the in-feed end of said drum, a firebox secured to the discharge end of said drum, a burner unit secured to said firebox and operable to create a flame for heating the atmosphere in said drum and drive contaminants from product in said drum, said drum being mounted to one side of said support frame, a scavenging burn assembly including a box member secured to said support frame adjacent the side of said drum and extending substantially the length of the drum and upwardly from the frame to about the upper level of said drum, said box member having an inlet end connected to said drum to receive the atmosphere from said drum and having an outlet end, a generally U-shaped quench unit located in substantially horizontal plane and having an inlet end secured to the outlet end of said box member, said quench unit over said box member and said drum with a U-shaped end connection to a discharge end of said quench unit, a tubular particle separator secured to the discharge end of said quench unit and lying substantially in the same plane as said quench unit and a recycle passageway unit secured to the inlet end of said drum and to said burner unit, and having means to transfer the atmosphere from said drum into said burner unit.

40. The apparatus of claim 39 wherein said frame defines the maximum width of the assembly and being less than eight feet whereby said frame is adapted to be mounted on a supporting vehicle bed for over-the-road transport.

41. The soil reclamation apparatus of claim 38 wherein said drum is a tapered drum having a horizontal axis of rotation.

42. The apparatus of claim 38 wherein said drum includes internal flight members secured to the internal drum surface, said flight members projecting partially inwardly to define an internal essentially flight free passage through the center of said drum, said in-feed conveyor being mounted to the same diameter end of said drum, a product discharge unit secured to the large diameter end of said drum, said flight members moving said product in a cascading movement through said drum.

43. The apparatus of claim 39 including a recycle unit having an inlet coupled to the in-feed end of said drum for withdrawing the atmosphere from said drum and having an outlet connected to said firebox for recycling said atmosphere through said drum.

44. An apparatus for remedial treatment of soil and like contaminated product incorporating volatile and burnable contaminant substances, comprising a supporting frame structure having a width and a length conforming to over-the-road transport limitations for transport over public roadways, comprising a chamber unit rotatably mounted to said frame structure for continuous controlled rotation, a burner unit fixedly secured to one end of said chamber unit and generating a flame projected into said chamber unit for driving said volatile substances from said product into the heated atmosphere within said chamber unit, said chamber unit being constructed and mounted for moving the product through said chamber unit, a separate burn unit secured directly to said flame structure and coupled to said chamber unit means to withdraw said atmosphere from chamber and pass said atmosphere into said burn unit, a cooling passageway unit connected to the outlet end of said burn unit, a separator connected to the passageway unit, said passageway unit and separator being secured to said frame structure in generally overlying relationship to said chamber unit and said burn unit, and means for exiting the balance of said withdrawn atmosphere essentially free of said volatile substances from said separator unit.

45. The apparatus of claim 44 including a supply unit adapted to be coupled to said chamber unit for transport therewith and operable to introduce product into said chamber unit.

46. The apparatus of claim 44 including a recycle system wherein said means for drawing of the heated atmosphere including said volatile substances from said chamber unit includes delivering at least a portion of withdrawn atmosphere to said chamber unit for recycling thereof through said chamber unit, and said burner unit being operable to ignite said volatile substances and establish incineration of said volatile substances within said chamber unit.

47. The apparatus of claim 46 including a conveying means for supplying product in a substantially continuous flow into said chamber unit, said chamber unit including means for tumbling of said contaminated product through said chamber unit and exposing of the contaminated product to said high temperature atmosphere within said chamber unit, said means for drawing of said atmosphere from within said chamber unit including delivering a significant part of said atmosphere to said burner unit to recycle substantial percentages of said atmosphere and delivering the balance of said atmosphere free of substantial levels of said contaminant substantial levels of said substances to said burn unit.

48. The apparatus of claim 44 wherein said chamber unit includes a rotating drum, said drum being substantially closed at the discharge end and includes a short tubular discharge member, said burner unit mounted to said discharge end and including a tubular coupling member telescoped with said tubular discharge member, and including an annular air gap between said discharge member and said coupling member for supplying oxygen to said atmosphere.

49. The apparatus of claim 44 including means for continuously monitoring a control temperature of the chamber unit related to said discharge soil, feed control means for varying the feed of product into said chamber unit in accordance with said control temperature to maintain a predetermined product discharge temperature and thereby control removal and destruction of contaminant substances.

50. The apparatus of claim 44 wherein said chamber unit includes a rotary tapered drum having a small diameter inlet end and a large diameter outlet end, said tapered drum having internal flight members secured to the internal surface and projecting partially inwardly and defining an essentially flight free passage through the center of said drum, and means mounting said drum to said frame for rotation on a horizontal axis of rotation, product supply opening secured to a first end of said drum, a product discharge opening secured to the large end of said drum, said flight members moving said product in a cascading movement through said drum, a high temperature burner unit secured to the large end of said drum and adapted to project a flame into said drum generally center of said drum.

51. The apparatus of claim 50 including an in-feed conveyor unit having an elongated tubular conveyor, a mounting unit connected to said conveyor unit and having a releasable attachment unit for coupling to said drum for moving product into said drum, said conveyor unit adapted to be extended into said drum for storage including over-the-road transport.

52. The apparatus of claim 44 wherein said final burn unit includes a substantially insulated box mounted on said frame adjacent one side of said drum and extending substantially the length of the drum, said cooling passageway unit including an elongated cooling tube unit connected to said final burn unit and overlying the upper plane of said drum and final burn unit, and having a discharge unit, said separator secured to the discharge end of said cooling tube unit and projecting toward the inlet end of said drum and lying substantially in the same plane as said cooling unit, said final burn box-like structure and said cooling tube unit defining the maximum width and height of the assembly and being less than maximum width and height provided by governmental regulations whereby said frame structure is adapted to be mounted as part of a vehicle structure for over-the-road transport.

53. The apparatus of claim 52 wherein said fixed burn unit extends upwardly from the frame to substantially the level of said drum, and said cooling tube unit includes a generally U-shaped quench tube located in a substantially horizontal plane and having an inlet end secured to the final burn box and extending to the discharge end of said drum with a U-shaped connection to a discharge end of said quench tube extending to approximately the center location of said drum.

54. The apparatus of claim 53 including a recycle passageway unit secured to the inlet end of said drum and to said firebox, said passageway unit being located within said cooling tube, a recycle unit secured in said recycle tube and operating to recycle the atmosphere from said drum and delivering said atmosphere directly into said firebox for injecting of recycled atmosphere directly into said burner unit, remaining contaminant gases in said recycled atmosphere being ignited by said burner and being recycled through said drum.

55. The apparatus of claim 53 wherein a water pump is mounted on said frame beneath said drum, said pump having an output connected to said quench tube to supply water to said quench tube for treatment of said atmosphere, a drain unit connected to said quench tube in the U-shaped connection, means for discharging of said drain unit, and a passageway unit connecting said separator to said quench tube unit adjacent the inlet end of the quench tube for recycling of the moisture and solids to said quench tube.

56. The apparatus of claim 53 wherein said width is no greater than eight feet and said height is not greater than nine feet.

57. The apparatus of claim 52 wherein said discharge unit includes a tubular housing having a tubular inlet extending substantially vertically and a discharge member extending angularly outwardly and upwardly of said inlet and having an internal feed screw, said tubular housing having a moisture inlet located at the lower end of said discharge member, and said passageway unit connecting said waste outlet to said moisture inlet.

58. A method for remedial treatment of soil and like contaminated loose product incorporating volatile and burnable contaminants by passage of said product through a rotating incineration chamber unit having a burner generating and projecting a flame into said chamber unit for creating a high temperature atmosphere within said chamber unit and driving said volatile substances from said product within said high temperature atmosphere, comprising conveying product through said chamber unit with the product tumbling throughout said chamber unit and producing a discharged product with volatile substances removed, drawing of the atmosphere including said volatile substances within said chamber unit from said chamber unit, delivering at least a portion of said withdrawn atmosphere directly to said burner for recycling thereof through said chamber unit for incineration of said volatile substances within said chamber unit, and treating the balance of said withdrawn atmosphere which is not recycled to said burner for removal of retained contaminant substances in said withdrawn atmosphere.

59. The method of claim 58 including passing said product directly through said flame.

60. The method of claim 58 including heating said product to exit said chamber unit at a temperature in excess of 400° F.

61. The method of claim 58 including continuously feeding contaminated product through said chamber unit, monitoring a temperature related to the temperature of said discharged product, varying the feed of said product into said chamber unit in accordance with said monitored temperature for controlling the product discharge temperature.

62. The method of claim 61 including said monitoring a temperature includes monitoring the temperature of said withdrawn atmosphere.

63. The method of claim 58 including the additional steps of heating the withdrawn atmosphere to destroy remaining volatile substances, cooling the withdrawn atmosphere, and separating of solid and moisture products from said cooled atmosphere.

64. The method of claim 62 including intermixing said separated products with said withdrawn atmosphere during said cooling step and removing said separated solid from said withdrawn atmosphere during said cooling step.

65. The method of claim 58 including passing said discharged product directly through said flame.

66. The method of claim 58 including delivering said withdrawn atmosphere to said burner adjacent the edge of said flame for creating a generally annular flame.

67. The method of claim 58 wherein said treating of said balance of said withdrawn atmosphere includes heating thereof to incinerate contaminant substances.

68. The method of claim 58 including measuring the temperature of said discharged product.

69. The method of claim 58 including continuously conveying product into said chamber unit in a single treatment pass through said chamber unit, delivering said withdrawn atmosphere to pass in a circular path about the outer edge of said flame and generating an annular flame projecting into chamber unit, passing said discharged product directly through said flames, monitoring the temperature of said discharged product and controlling said heating of said product to exit said chamber unit at a temperature in excess of about 400° F., heating the withdrawn atmosphere to destroy remaining volatile substances, cooling the withdrawn atmosphere, separating of solid and moisture products from said cooled atmosphere and introducing said solid and moisture separated products into said cooled atmosphere, and removing said separated solid and moisture product from said cooled atmosphere.

70. The method of claim 69 wherein said monitoring step includes detecting the exhaust temperature of the withdrawn atmosphere and varying the feed of said product into said chamber unit in accordance with said exhaust temperature to maintain said predetermined product discharge temperature.

71. A compact over-the-road reclamation apparatus for remedial treatment of soil and like contaminated products incorporating volatile and burnable contaminants, comprising a wheeled framed structure having supporting over-the-road wheels laterally spaced from each other by a distance less than eight feet, consideration drum unit rotatably mounted on said frame structure for continuous controlled rotation, said drum unit having a product inlet end and a product discharge end, an elongated afterburner unit with an inlet end and a high temperature for receiving of volatile product from said drum unit and including a high temperature burner for increasing the temperature within the afterburner unit to a level for destruction of product within the said gaseous medium, said rotating drum unit and said afterburner unit being mounted in side-by-side relation on said frame structure and each extending from the rear to the rear of said frame structure, a quench unit adapted to be coupled to said afterburner unit for cooling of the discharge gaseous medium from said afterburner unit, a separate powered particle separator including a blower unit establishing a negative input pressure and a positive output pressure and having an inlet connected to the outlet of said quench unit, and a support structure supporting said quench unit and said separator above said drum unit and said afterburner unit, and being located inwardly of the outermost wall structures of said drum unit and said afterburner unit, the uppermost structure of said quench unit and said separator unit being located to permit movement over the road for over-the-road transport in accordance with governmental regulations.

72. The over-the-road remedial apparatus of claim 71, wherein said quench unit includes a water inlet unit for establishing an atomized water environment within the quench unit through which the afterburner gaseous medium is passed to remove particles, and a removal unit for removal of condensed water and particles from said quench unit.

73. The apparatus of claim 72, wherein said quench unit is an elongated tubular member having an elongated linear portion overlying said afterburner and a generally L-shaped external portion extending across the drum unit and backwardly over the drum unit to the power separator, said quench chamber being inclined vertically downwardly with a lowermost end at the connection between the linear section and the return section whereby condensed water and particulate drain downwardly to said lowermost section, said removal unit being connected to said return section.

74. A rotation product apparatus for removing a contaminant from soil and other like products, comprising a drum unit for passing of the contaminated product therethrough and including a burner for raising the temperature within the drum to at least remove the substantial or volatile product or contaminants from the contaminated product, discharging of the removed volatile gaseous medium from the drum unit, and including a recycle means for directing and recycling of the gaseous product back to the burner and including directional flow means for unit for directing of the contaminated gaseous medium directly into the flame of the burner for ignition of the contaminated product and contributing directly to the creation of said flame projecting inwardly into the said drum unit.

75. An apparatus for remedial treatment of contaminated products incorporating at least one volatile and burnable contaminant, comprising an incineration drum unit, a heating unit connected to said drum unit and generating a flame projected into said drum unit for driving said volatile substances from said product, a supply unit for introducing product into said drum unit, said drum unit being constructed and arranged to move said product through said drum unit, means for drawing of the atmosphere including said volatile substances from within said drum unit for removal and destruction of the volatile contaminants, and a removal means coupled to said system for separating solids from said withdrawn atmosphere, and said drum unit including an end plate with a central discharge opening, and said drum including a plurality of discharge flights for directing of the product through the upper portion of said opening and passing the product through said flame.

76. The apparatus of claim 75 wherein a discharge tube is secured within said opening and projects from the drum, a heating unit includes a burner tube extended into said discharge tube, a heating unit includes a burner tube extended into said discharge tube, said discharge tube and said burner tube being constructed and arranged to form an air passageway therebetween for providing air and thereby oxygen to said flame.

77. An apparatus for remedial treatment of contaminated products incorporating at least one volatile and burnable contaminant, comprising an incineration chamber unit, a heating unit connected to said unit and generating a flame projected into said chamber unit for driving said volatile substances from said product, a supply unit for introducing product into said chamber unit, said chamber unit being constructed and arranged to move said product through said chamber unit, means for drawing of the atmosphere including said volatile substances and fines within said chamber unit from said chamber unit, a removal means for destroying volatile contaminants in said withdrawn atmosphere, said removal means including heat means to heat the withdrawn atmosphere to a volatile destructive temperature, a quenching means coupled to said heating means for introducing a moisture mist into said atmosphere to cool the atmosphere and moisture of said fines, and means to remove condensed moisture and fines, and a separator coupled to said quench unit to receive said cooled atmosphere and to remove remaining fines therein and to discharge an environmental clean atmosphere from said separator.

* * * * *